(12) United States Patent
Tabata et al.

(10) Patent No.: US 6,808,469 B2
(45) Date of Patent: Oct. 26, 2004

(54) PLANETARY GEAR TYPE MULTIPLE-STEP TRANSMISSION FOR VEHICLE

(75) Inventors: Atsushi Tabata, Okazaki (JP); Yasuo Hojo, Nagoya (JP); Akira Hoshino, Nishikamo-gun (JP); Terufumi Miyazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/189,449

(22) Filed: Jul. 8, 2002

(65) Prior Publication Data

US 2003/0008747 A1 Jan. 9, 2003

(30) Foreign Application Priority Data

Jul. 6, 2001 (JP) ....................................... 2001-206471
Oct. 4, 2001 (JP) ....................................... 2001-308925
May 20, 2002 (JP) ....................................... 2002-145513

(51) Int. Cl.[7] ............................. F16H 3/62; F16H 3/44
(52) U.S. Cl. ....................... 475/276; 475/277; 475/279; 475/280; 475/281
(58) Field of Search ............................. 475/275, 276, 475/279, 280, 281

(56) References Cited

U.S. PATENT DOCUMENTS

| | | | | |
|---|---|---|---|---|
| 3,863,524 A | * | 2/1975 | Mori et al. ................... | 475/57 |
| 4,653,348 A | * | 3/1987 | Hiraiwa ....................... | 475/276 |
| 5,049,116 A | * | 9/1991 | Asada .......................... | 475/269 |
| 5,090,952 A | * | 2/1992 | Asada .......................... | 475/278 |
| 5,127,288 A | * | 7/1992 | Hojo et al. ................... | 74/335 |
| 5,203,234 A | * | 4/1993 | Asada et al. ................. | 477/143 |
| 6,083,135 A | * | 7/2000 | Baldwin et al. ............. | 475/276 |

FOREIGN PATENT DOCUMENTS

| | | |
|---|---|---|
| JP | 8-105496 | 4/1996 |
| JP | 2956173 | 7/1999 |
| JP | 2000-199549 | 7/2000 |
| JP | 2000-266138 | 9/2000 |
| JP | 2001-82555 | 3/2001 |
| WO | WO 01/04513 | 1/2001 |
| WO | WO 01/27496 | 4/2001 |

\* cited by examiner

*Primary Examiner*—Charles A Marmor
*Assistant Examiner*—David D. Le
(74) *Attorney, Agent, or Firm*—Oblon, Spivak, McClelland, Maier & Neustadt, PC

(57) ABSTRACT

A vehicle planetary gear type multiple-step transmission wherein each of five rotary elements is constituted by sun gears, carriers and ring gears of three planetary gear sets, and speeds of the rotary elements are represented by respective straight lines in a collinear chart, and the first, second and third rotary elements are made stationary by respective first, second and third brakes, and the fifth, third and first rotary elements are connected to an input shaft by respective first, second and third clutches, while the third rotary element is brought to a disconnected state by fourth clutch, and the fourth rotary element is connected to an output rotary member.

31 Claims, 15 Drawing Sheets

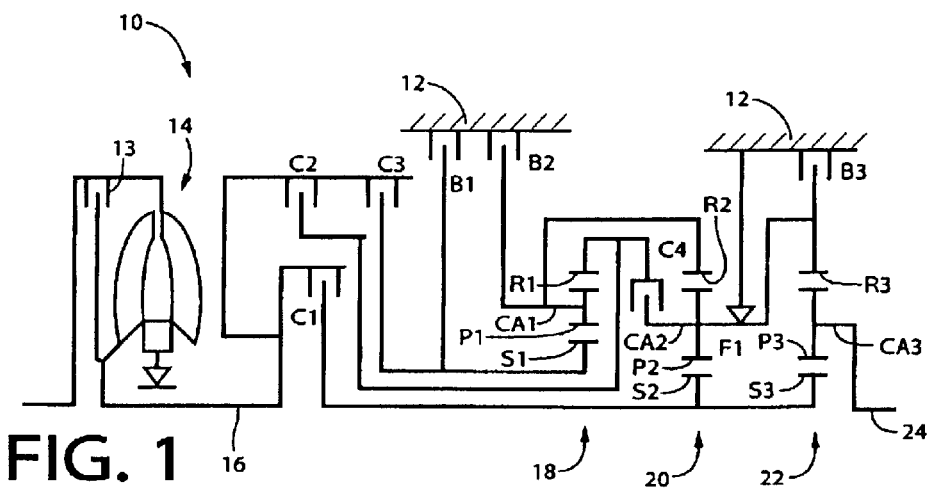

| | C1 | C2 | C3 | C4 | B1 | B2 | B3 | F1 | SPEED RATIO $\gamma$ ($\rho_1$=0.551, $\rho_2$=0.326, $\rho_3$=0.320) | |
|---|---|---|---|---|---|---|---|---|---|---|
| 1st | O | | | △ | | | ◉ | O | $(1+\rho_3)/\rho_3$ | 4.125 |
| 2nd | O | | | △ | | O | | | $(1+\rho_2)(1+\rho_3)/\{\rho_3+\rho_2(1+\rho_3)\}$ | 2.333 |
| 3rd | O | | | O | O | | | | $\{(\rho_1+\rho_2+\rho_1\rho_2)(1+\rho_3)\}/\{\rho_1\rho_3+\rho_2(1+\rho_3)+\rho_1\rho_2(1+\rho_3)\}$ | 1.654 |
| 4th | O | O | | | O | | | | $\{(1+\rho_1)(1+\rho_2)(1+\rho_3)\}/\{\rho_1(\rho_2+\rho_3+\rho_2\rho_3)+(1+\rho_2)(1+\rho_3)\}$ | 1.255 |
| 5th | O | O | △ | O | | | | | 1 | 1.000 |
| 6th | | O | | O | O | | | | $\{(1+\rho_3)(\rho_2+\rho_1\rho_2)\}/\{\rho_1\rho_3+(1+\rho_3)(\rho_2+\rho_1\rho_2)\}$ | 0.791 |
| 7th | | O | | O | | | O | | $(1+\rho_3)\rho_2/\{(1+\rho_3)\rho_2+\rho_3\}$ | 0.573 |
| R | | | O | O | | | O | | $(\rho_2+\rho_1\rho_2)(1+\rho_3)/\rho_1\rho_3$ | 3.781 |

O: ENGAGED  ◉: ENGAGED FOR ENGINE BRAKING  △: ENGAGED WITHOUT POWER TRANSMISSION

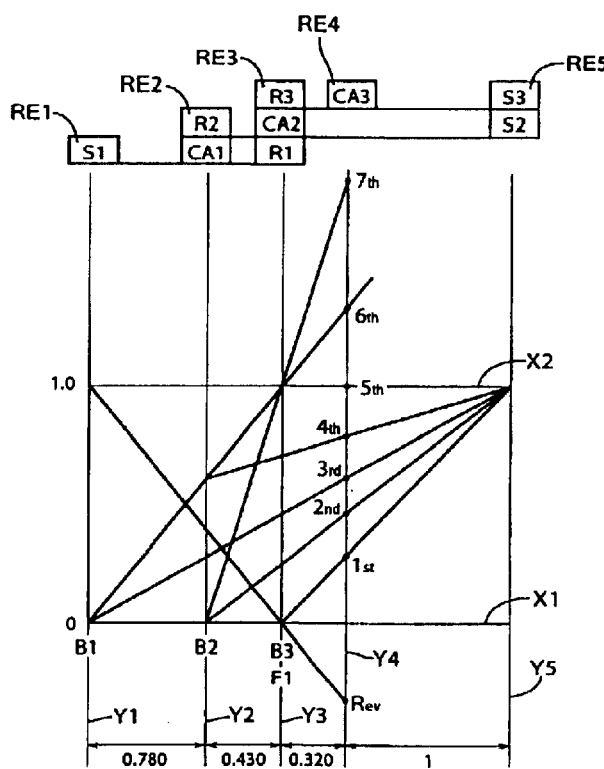

FIG. 3

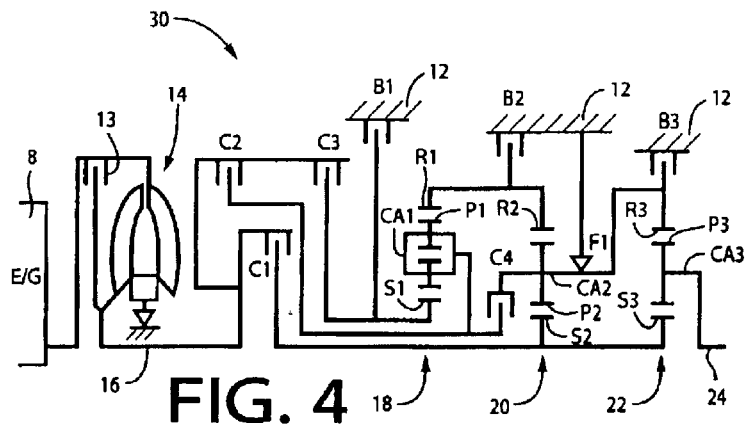

| | C1 | C2 | C3 | C4 | B1 | B2 | B3 | F1 | SPEED RATIO ($\rho_1$=0.420, $\rho_2$=0.334, $\rho_3$=0.360) | |
|---|---|---|---|---|---|---|---|---|---|---|
| 1st | O | | | △ | | | ⊚ | O | $1+1/\rho_3$ | 3.778 |
| 2nd | O | | | △ | | O | | | $(1+\rho_3)/[\rho_2/(1+\rho_2)+\rho_3]$ | 2.229 |
| 3rd | O | | | O | O | | | | $(1+\rho_3)/[\rho_2/(\rho_1+\rho_2)+\rho_3]$ | 1.694 |
| 4th | O | O | | | O | | | | $(1+\rho_3)/[(1-\rho_1+\rho_2)/(1+\rho_2)+\rho_3]$ | 1.301 |
| 5th | O | O | O | | | | | | 1 | 1.000 |
| 6th | | O | O | O | | | | | $(1+\rho_3)/[1+(\rho_1+\rho_2)\rho_3/\rho_2]$ | 0.750 |
| 7th | | O | O | | | O | | | $(1+\rho_3)/[\rho_3((1+\rho_2)/\rho_2)+1]$ | 0.558 |
| R | | | O | O | | | O | | $-[\rho_2 \times (1+\rho_3)/\rho_3]/\rho_1$ | 3.003 |

O: ENGAGED  ⊚: ENGAGED FOR ENGINE BRAKING  △: ENGAGED WITHOUT POWER TRANSMISSION

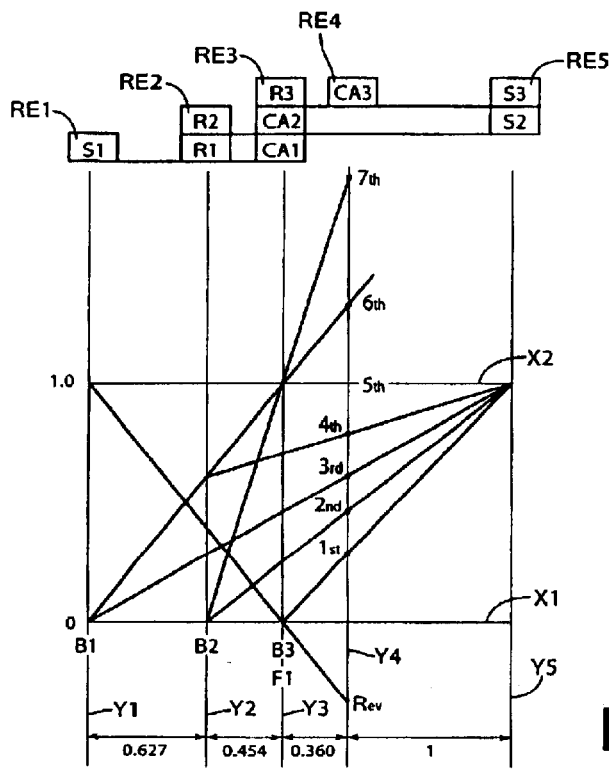

FIG. 6

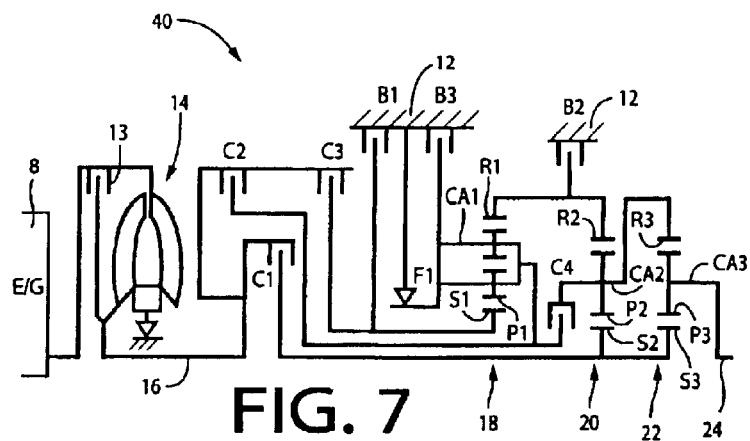

|  | C1 | C2 | C3 | C4 | B1 | B2 | B3 | F1 | SPEED RATIO ($\rho_1$=0.420, $\rho_2$=0.334, $\rho_3$=0.360) | |
|---|---|---|---|---|---|---|---|---|---|---|
| 1st | O |  |  | O |  |  | ◉ | O | $1+1/\rho_3$ | 3.778 |
| 2nd | O |  |  | △ |  | O |  |  | $(1+\rho_3)/[\rho_2/(1+\rho_2)+\rho_3]$ | 2.229 |
| 3rd | O |  | O | O |  |  |  |  | $(1+\rho_3)/[\rho_2/(\rho_1+\rho_2)+\rho_3]$ | 1.694 |
| 4th | O | O |  | O |  |  |  |  | $(1+\rho_3)/[(1-\rho_1+\rho_2)/(1+\rho_2)+\rho_3]$ | 1.301 |
| 5th | O | O | O |  |  |  |  |  | 1 | 1.000 |
| 6th |  | O | O | O |  |  |  |  | $(1+\rho_3)/[1+(\rho_1+\rho_2)\rho_3/\rho_2]$ | 0.750 |
| 7th |  | O | O |  |  | O |  |  | $(1+\rho_3)/[\rho_3((1+\rho_2)/\rho_2)+1]$ | 0.558 |
| R |  |  | O | O |  |  | O |  | $-[\rho_2\times(1+\rho_3)/\rho_3]/\rho_1$ | 3.003 |

O: ENGAGED  ◉: ENGAGED FOR ENGINE BRAKING  △: ENGAGED WITHOUT POWER TRANSMISSION

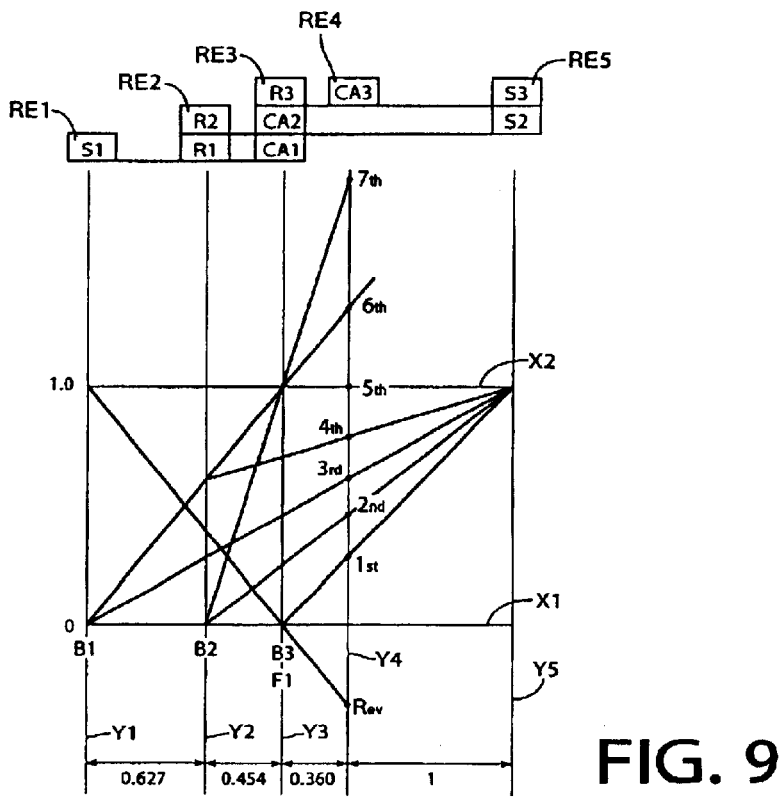

FIG. 9

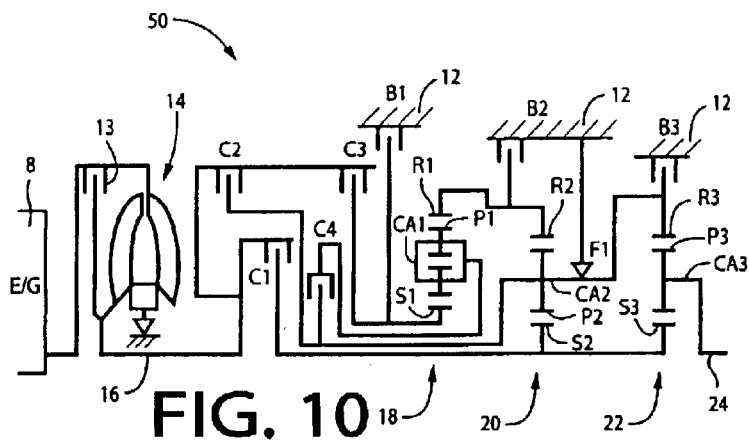

| | C1 | C2 | C3 | C4 | B1 | B2 | B3 | F1 | SPEED RATIO ($\rho_1=0.420, \rho_2=0.334, \rho_3=0.360$) | |
|---|---|---|---|---|---|---|---|---|---|---|
| 1st | O | | | △ | | | ⊙ | O | $1+1/\rho_3$ | 3.778 |
| 2nd | O | | | △ | | O | | | $(1+\rho_3)/[\rho_2/(1+\rho_2)+\rho_3]$ | 2.229 |
| 3rd | O | | O | O | | | | | $(1+\rho_3)/[\rho_2/(\rho_1+\rho_2)+\rho_3]$ | 1.694 |
| 4th | O | O | | O | | | | | $(1+\rho_3)/[(1-\rho_1+\rho_2)/(1+\rho_2)+\rho_3]$ | 1.301 |
| 5th | O | O | O | | | | | | 1 | 1.000 |
| 6th | | O | O | O | | | | | $(1+\rho_3)/[1+(\rho_1+\rho_2)\rho_3/\rho_2]$ | 0.750 |
| 7th | | O | O | | | | | O | $(1+\rho_3)/[\rho_3((1+\rho_2)/\rho_2)+1]$ | 0.558 |
| R | | | | O | O | | | O | $-[\rho_2 \times (1+\rho_3)/\rho_3]/\rho_1$ | 3.003 |

O: ENGAGED   ⊙: ENGAGED FOR ENGINE BRAKING   △: ENGAGED WITHOUT POWER TRANSMISSION

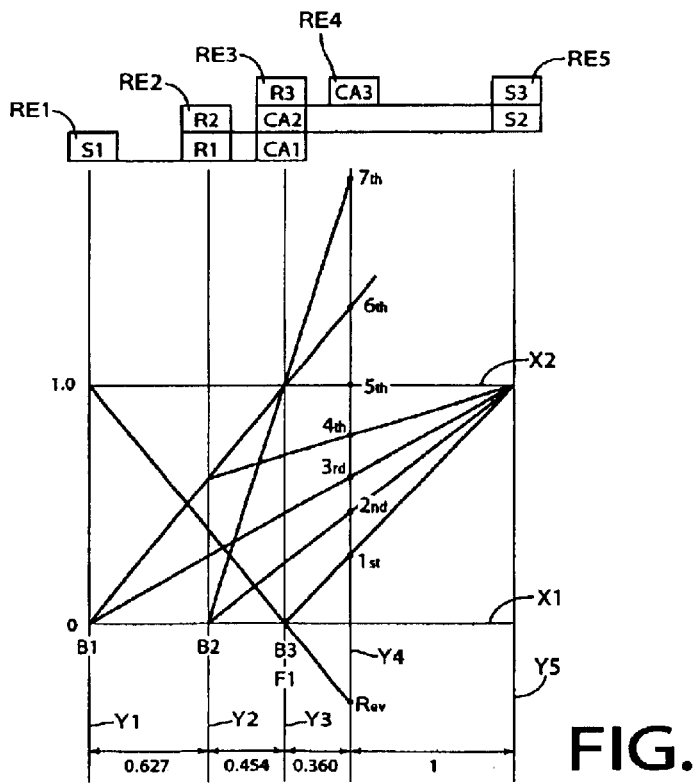

FIG. 12

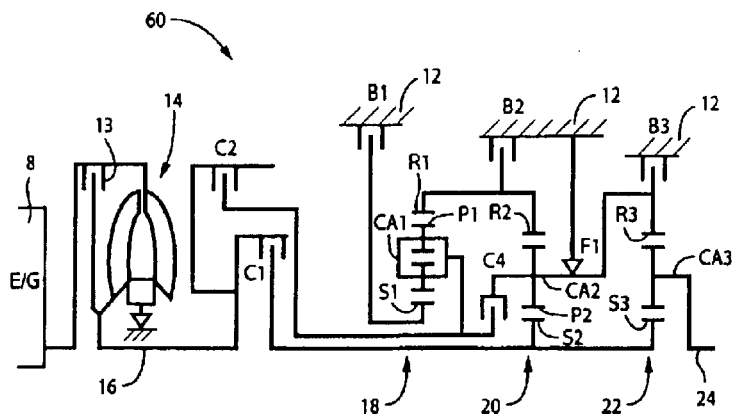
FIG. 13
FIG. 14
|   | C1 | C2 | C4 | B1 | B2 | B3 | F1 | SPEED RATIO ($\rho_1=0.435$, $\rho_2=0.346$, $\rho_3=0.360$) |   |
|---|---|---|---|---|---|---|---|---|---|
| 1st | O |  | △ |  |  | ◉ | O | $1+1/\rho_3$ | 3.778 |
| 2nd | O |  | △ |  | O |  |  | $(1+\rho_3)/[\rho_2/(1+\rho_2)+\rho_3]$ | 2.205 |
| 3rd | O |  | O | O |  |  |  | $(1+\rho_3)/[\rho_2/(\rho_1+\rho_2)+\rho_3]$ | 1.694 |
| 4th | O | O |  | O |  |  |  | $(1+\rho_3)/[(1-\rho_1+\rho_2)/(1+\rho_2)+\rho_3]$ | 1.312 |
| 5th | O | O | O |  |  |  |  | 1 | 1.000 |
| 6th |  | O | O | O |  |  |  | $(1+\rho_3)/[1+(\rho_1+\rho_2)\rho_3/\rho_2]$ | 0.750 |
| 7th |  | O | O |  | O |  |  | $(1+\rho_3)/[\rho_3((1+\rho_2)/\rho_2)+1]$ | 0.566 |
| R |  | O |  | O |  | O |  | $-(1+\rho_3)\rho_2/(1-\rho_1)\rho_3$ | 2.311 |
O: ENGAGED  ◉: ENGAGED FOR ENGINE BRAKING  △: ENGAGED WITHOUT POWER TRANSMISSION
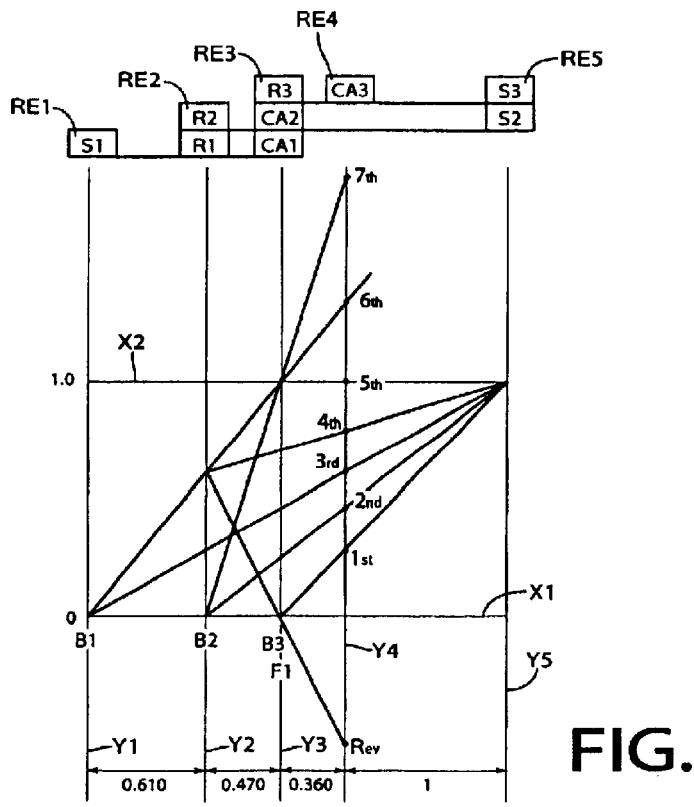
FIG. 15

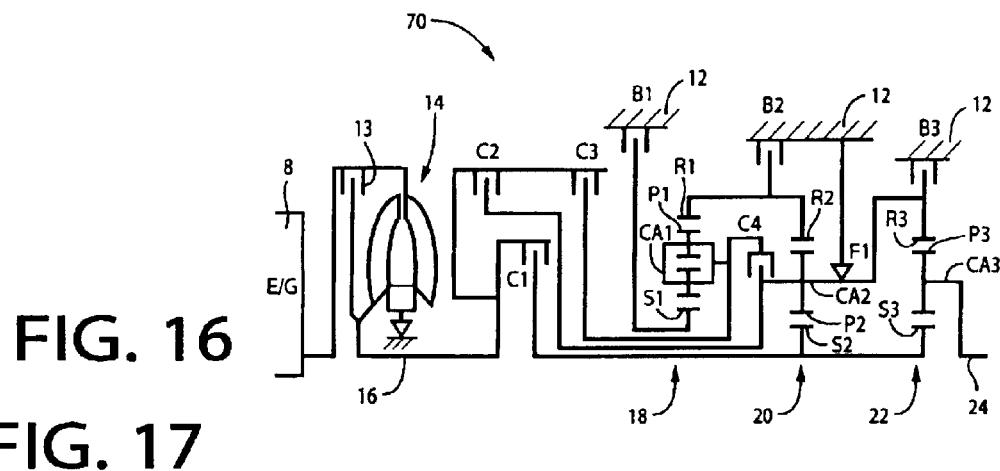
FIG. 16
FIG. 17
| | C1 | C2 | C3 | C4 | B1 | B2 | B3 | F1 | SPEED RATIO ($\rho_1$=0.435, $\rho_2$=0.346, $\rho_3$=0.360) | |
|---|---|---|---|---|---|---|---|---|---|---|
| 1st | O | | | △ | | | ◉ | O | $1+1/\rho_3$ | 3.778 |
| 2nd | O | | | △ | | O | | | $(1+\rho_3)/[\rho_2/(1+\rho_2)+\rho_3]$ | 2.205 |
| 3rd | O | | | O | O | | | | $(1+\rho_3)/[\rho_2/(\rho_1+\rho_2)+\rho_3]$ | 1.694 |
| 4th | O | | O | | | O | | | $(1+\rho_3)/[(1-\rho_1+\rho_2)/(1+\rho_2)+\rho_3]$ | 1.312 |
| 5th | O | O | △ | △ | | | | | 1 | 1.000 |
| 6th | | O | | O | O | | | | $(1+\rho_3)/[1+(\rho_1+\rho_2)\rho_3/\rho_2]$ | 0.750 |
| 7th | | O | | | | O | | | $(1+\rho_3)/[\rho_3((1+\rho_2)/\rho_2)+1]$ | 0.566 |
| R | | | O | O | | | O | | $-(1+\rho_3)\rho_2/(1-\rho_1)\rho_3$ | 2.311 |
O: ENGAGED  ◉: ENGAGED FOR ENGINE BRAKING  △: ENGAGED WITHOUT POWER TRANSMISSION
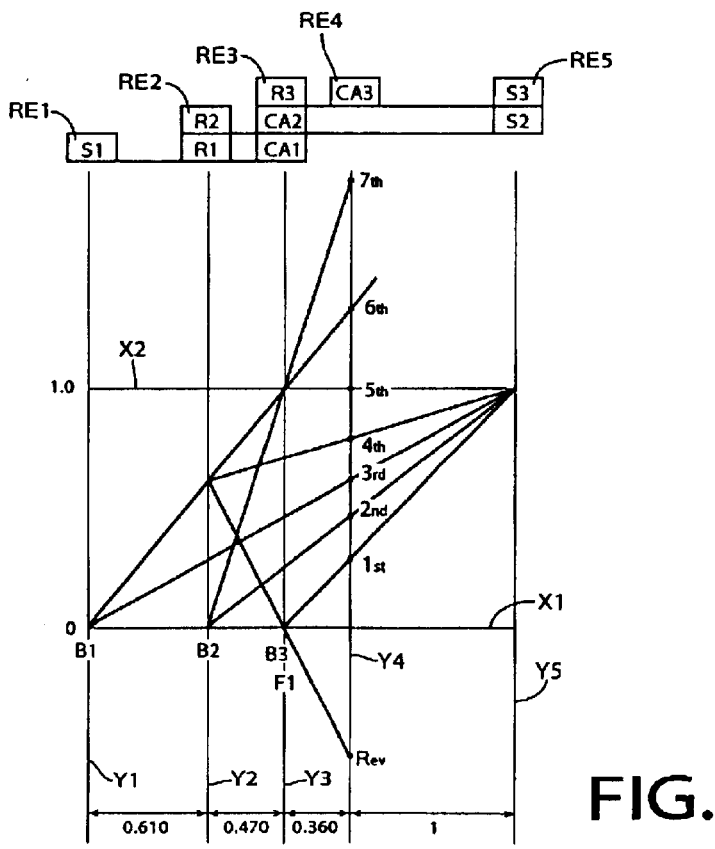
FIG. 18

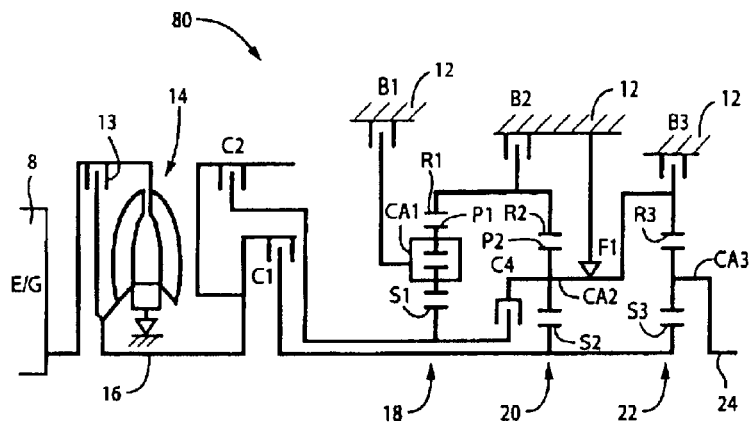
FIG. 19
FIG. 20
|  | C1 | C2 | C4 | B1 | B2 | B3 | F1 | SPEED RATIO ($\rho_1=0.565, \rho_2=0.346, \rho_3=0.360$) | |
|---|---|---|---|---|---|---|---|---|---|
| 1st | O |  | △ |  |  | ◎ | O | $1+1/\rho_3$ | 3.778 |
| 2nd | O |  | △ |  | O |  |  | $(1+\rho_3)/[\rho_2/(1+\rho_2)+\rho_3]$ | 2.205 |
| 3rd | O |  | O | O |  |  |  | $(1+\rho_3)/[\rho_2/(1+\rho_2-\rho_1)+\rho_3]$ | 1.694 |
| 4th | O | O |  | O |  |  |  | $(1+\rho_3)/[(\rho_1+\rho_2)/(1+\rho_2)+\rho_3]$ | 1.312 |
| 5th | O | O | O |  |  |  |  | 1 | 1.000 |
| 6th |  | O | O | O |  |  |  | $(1+\rho_3)/[1+\rho_3(1+\rho_2-\rho_1)/\rho_2]$ | 0.750 |
| 7th |  | O | O |  | O |  |  | $(1+\rho_3)/[1+\rho_3(1+\rho_2)/\rho_2]$ | 0.566 |
| R |  | O |  |  |  | O | O | $-(1+\rho_3)\rho_2/\rho_2\cdot\rho_3$ | 2.311 |
O: ENGAGED   ◎: ENGAGED FOR ENGINE BRAKING   △: ENGAGED WITHOUT POWER TRANSMISSION
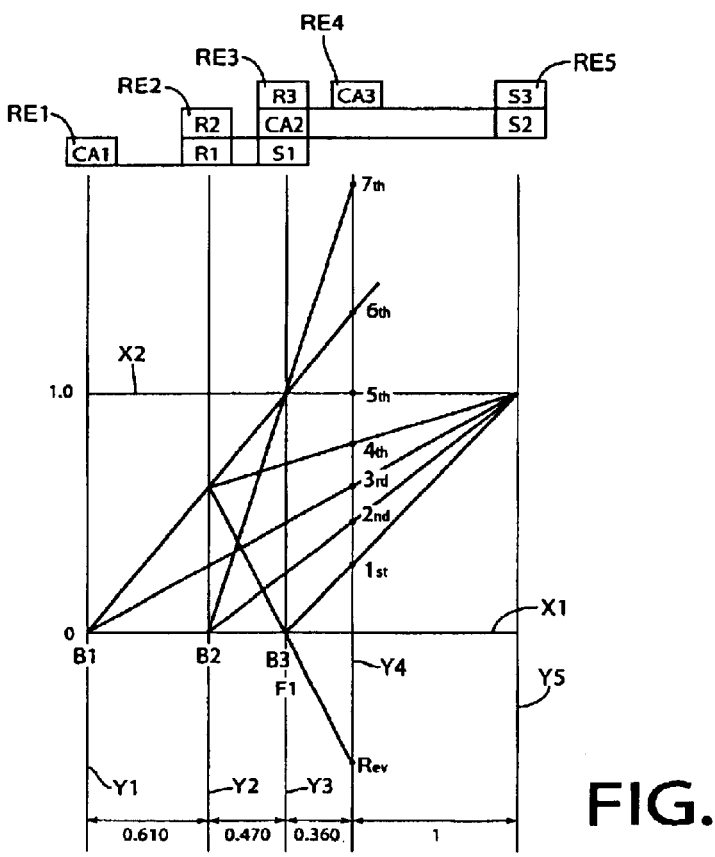
FIG. 21

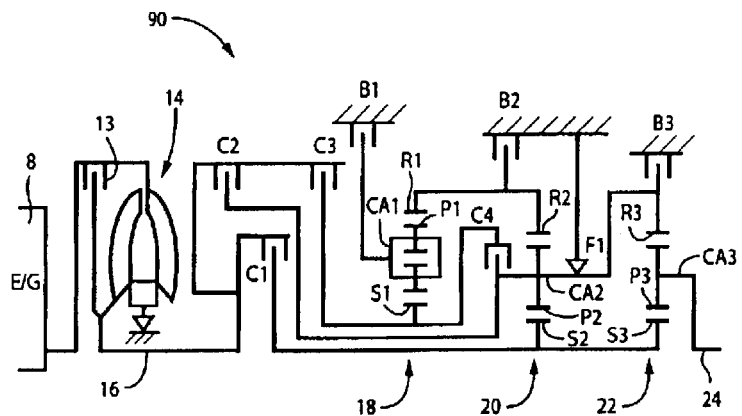

| | C1 | C2 | C3 | C4 | B1 | B2 | B3 | F1 | SPEED RATIO ($\rho_1$=0.565, $\rho_2$=0.346, $\rho_3$=0.360) | |
|---|---|---|---|---|---|---|---|---|---|---|
| 1st | O | | | △ | | | ◉ | O | $1+1/\rho_3$ | 3.778 |
| 2nd | O | | | △ | | O | | | $(1+\rho_3)/[\rho_2/(1+\rho_2)+\rho_3]$ | 2.205 |
| 3rd | O | | | O | O | | | | $(1+\rho_3)/[\rho_2/(1+\rho_2-\rho_1)+\rho_3]$ | 1.694 |
| 4th | O | | O | | O | | | | $(1+\rho_3)/[(\rho_1+\rho_2)/(1+\rho_2)+\rho_3]$ | 1.312 |
| 5th | O | O | △ | △ | | | | | 1 | 1.000 |
| 6th | | O | | O | O | | | | $(1+\rho_3)/[1+\rho_3(1+\rho_2-\rho_1)/\rho_2]$ | 0.750 |
| 7th | | O | | | | O | | | $(1+\rho_3)/[1+\rho_3(1+\rho_2)/\rho_2]$ | 0.566 |
| R | | | O | | O | | O | | $-(1+\rho_3)\rho_2/\rho_2\cdot\rho_3$ | 2.311 |

O: ENGAGED  ◉: ENGAGED FOR ENGINE BRAKING  △: ENGAGED WITHOUT POWER TRANSMISSION

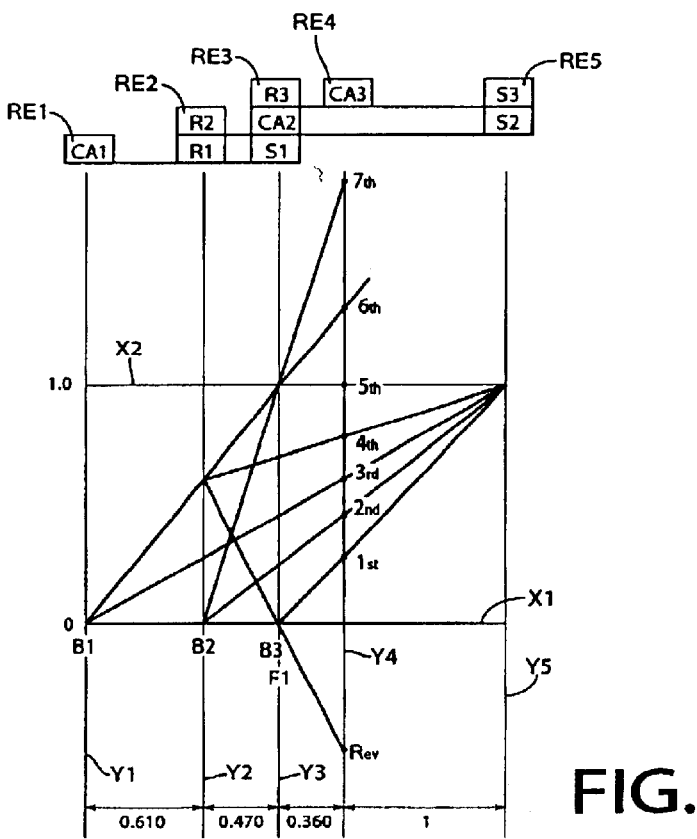

FIG. 24

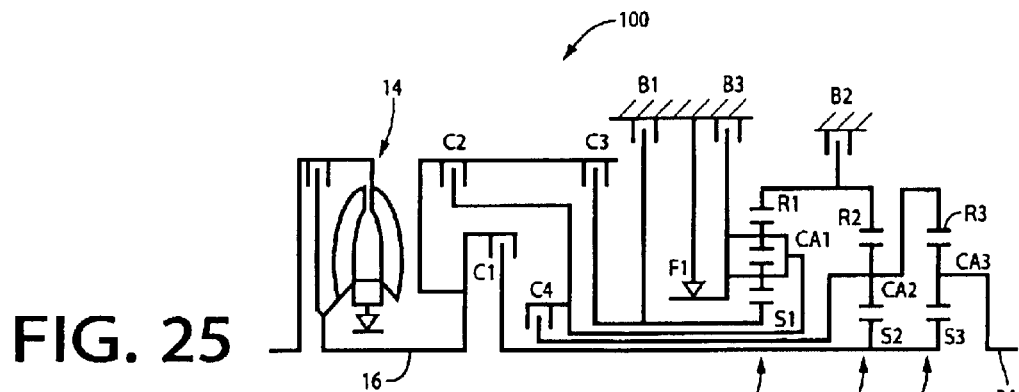

| | C1 | C2 | C3 | C4 | B1 | B2 | B3 | F1 | SPEED RATIO ($\rho_1$=0.420, $\rho_2$=0.334, $\rho_3$=0.360) | |
|---|---|---|---|---|---|---|---|---|---|---|
| 1st | O | | | O | | | ⊙ | O | $1+1/\rho_3$ | 3.778 |
| 2nd | O | | | △ | | O | | | $(1+\rho_3)/[\rho_2/(1+\rho_2)+\rho_3]$ | 2.229 |
| 3rd | O | | | O | O | | | | $(1+\rho_3)/[\rho_2/(\rho_1+\rho_2)+\rho_3]$ | 1.694 |
| 4th | O | O | | | O | | | | $(1+\rho_3)/[(1-\rho_1+\rho_2)/(1+\rho_2)+\rho_3]$ | 1.301 |
| 5th | O | O | | O | | | | | 1 | 1.000 |
| 6th | | O | | O | O | | | | $(1+\rho_3)/[1+(\rho_1+\rho_2)\rho_3/\rho_2]$ | 0.750 |
| 7th | | O | | O | | | O | | $(1+\rho_3)/[\rho_3[(1+\rho_2)/\rho_2]+1]$ | 0.558 |
| R | | | O | O | | O | | | $-[\rho_2\times(1+\rho_3)/\rho_3]/\rho_1$ | 3.003 |

O: ENGAGED ⊙: ENGAGED FOR ENGINE BRAKING △: ENGAGED WITHOUT POWER TRANSMISSION

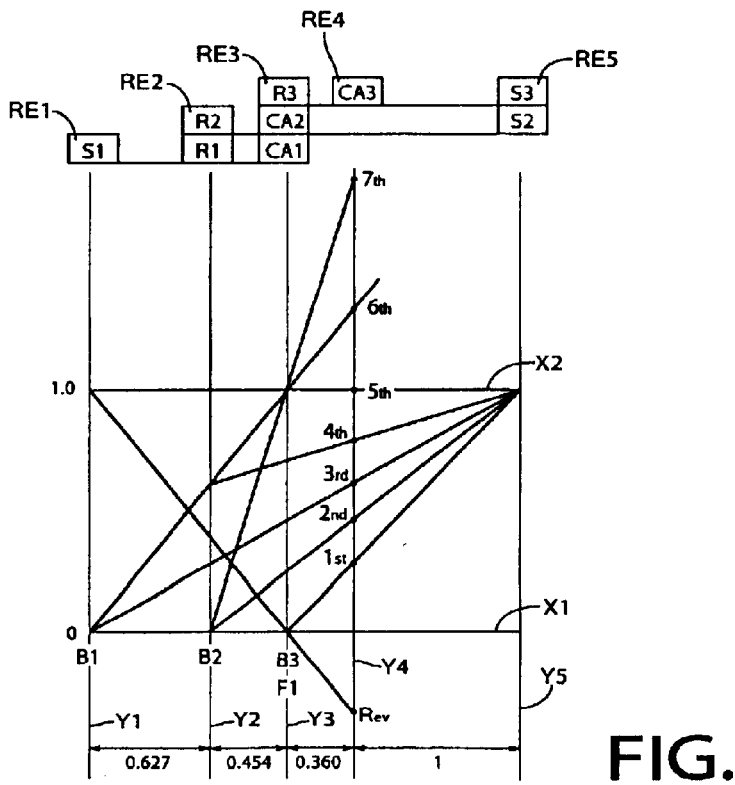

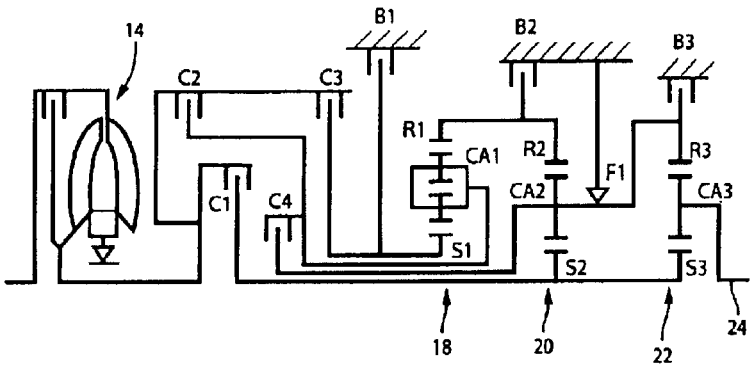

FIG. 29

| | C1 | C2 | C3 | C4 | B1 | B2 | B3 | F1 | SPEED RATIO ($\rho_1$=0.420, $\rho_2$=0.334, $\rho_3$=0.360) | |
|---|---|---|---|---|---|---|---|---|---|---|
| 1st | O | | | △ | | | ◎ | O | $1+1/\rho_3$ | 3.778 |
| 2nd | O | | | △ | | O | | | $(1+\rho_3)/[\rho_2/(1+\rho_2)+\rho_3]$ | 2.229 |
| 3rd | O | | | O | O | | | | $(1+\rho_3)/[\rho_2/(\rho_1+\rho_2)+\rho_3]$ | 1.694 |
| 4th | O | O | | | O | | | | $(1+\rho_3)/[(1-\rho_1+\rho_2)/(1+\rho_2)+\rho_3]$ | 1.301 |
| 5th | O | O | O | | | | | | 1 | 1.000 |
| 6th | | O | O | O | | | | | $(1+\rho_3)/[1+(\rho_1+\rho_2)\rho_3/\rho_2]$ | 0.750 |
| 7th | | O | O | | | O | | | $(1+\rho_3)/[\rho_3((1+\rho_2)/\rho_2)+1]$ | 0.558 |
| R | | | O | O | | | O | | $-[\rho_2 \times (1+\rho_3)/\rho_3]/\rho_1$ | 3.003 |

O: ENGAGED  ◎: ENGAGED FOR ENGINE BRAKING  △: ENGAGED WITHOUT POWER TRANSMISSION

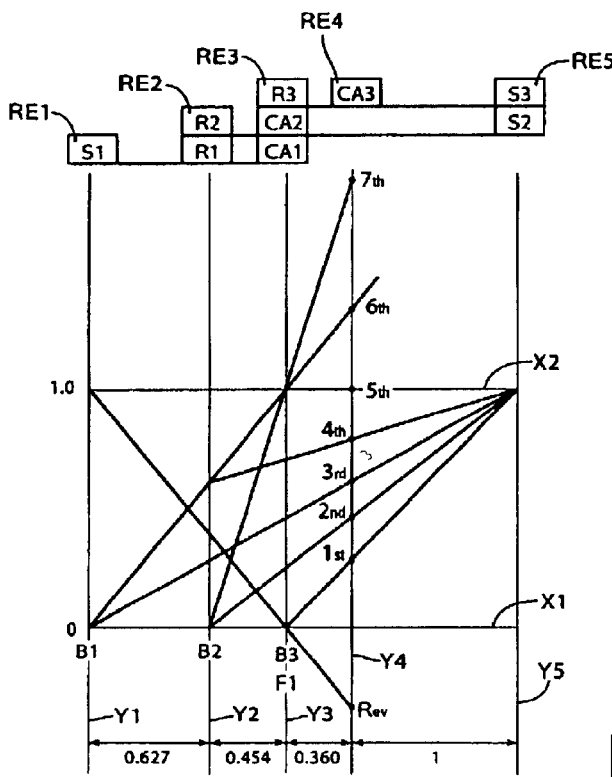

FIG. 30

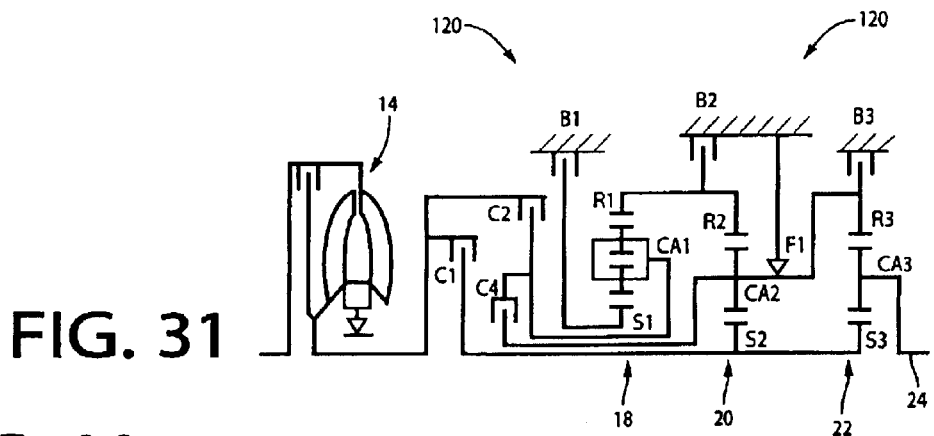
FIG. 31
FIG. 32
|  | C1 | C2 | C4 | B1 | B2 | B3 | F1 | SPEED RATIO ($\rho_1$=0.435, $\rho_2$=0.346, $\rho_3$=0.360) |  |
|---|---|---|---|---|---|---|---|---|---|
| 1st | O |  | △ |  |  | ◎ | O | $1+1/\rho_3$ | 3.778 |
| 2nd | O |  | △ |  | O |  |  | $(1+\rho_3)/[\rho_2/(1+\rho_2)+\rho_3]$ | 2.205 |
| 3rd | O |  | O | O |  |  |  | $(1+\rho_3)/[\rho_2/(\rho_1+\rho_2)+\rho_3]$ | 1.694 |
| 4th | O | O |  | O |  |  |  | $(1+\rho_3)/[(1-\rho_1+\rho_2)/(1+\rho_2)+\rho_3]$ | 1.312 |
| 5th | O | O | O |  |  |  |  | 1 | 1.000 |
| 6th |  | O | O | O |  |  |  | $(1+\rho_3)/[1+(\rho_1+\rho_2)\rho_3/\rho_2]$ | 0.750 |
| 7th |  | O | O |  | O |  |  | $(1+\rho_3)/[\rho_3[(1+\rho_2)/\rho_2]+1]$ | 0.566 |
| R |  | O |  | O |  | O |  | $-(1+\rho_3)\rho_2/(1-\rho_1)\rho_3$ | 2.311 |
O: ENGAGED  ◎: ENGAGED FOR ENGINE BRAKING  △: ENGAGED WITHOUT POWER TRANSMISSION
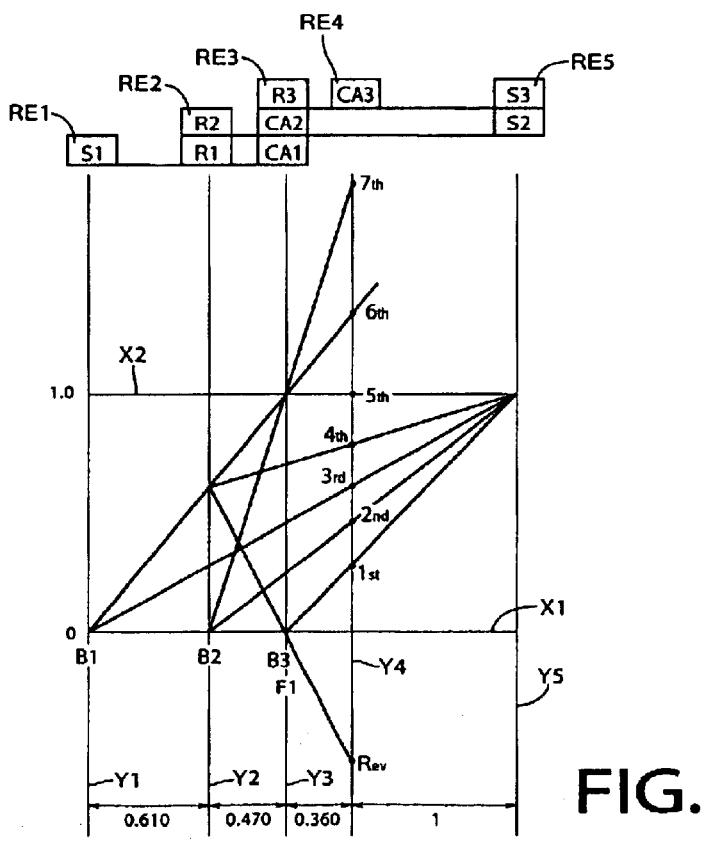
FIG. 33

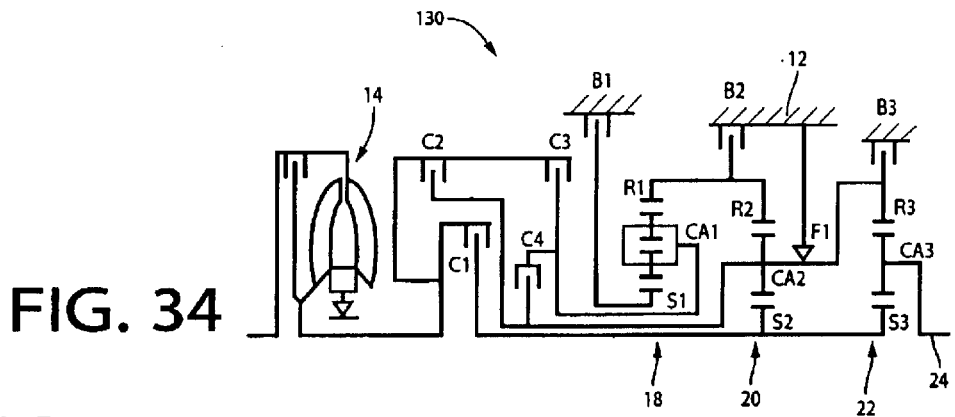
FIG. 34
FIG. 35
| | C1 | C2 | C3 | C4 | B1 | B2 | B3 | F1 | SPEED RATIO ($\rho_1=0.435, \rho_2=0.346, \rho_3=0.360$) | |
|---|---|---|---|---|---|---|---|---|---|---|
| 1st | ○ | | | △ | | | ◉ | ○ | $1+1/\rho_3$ | 3.778 |
| 2nd | ○ | | | △ | | ○ | | | $(1+\rho_3)/[\rho_2/(1+\rho_2)+\rho_3]$ | 2.205 |
| 3rd | ○ | | | ○ | ○ | | | | $(1+\rho_3)/[\rho_2/(\rho_1+\rho_2)+\rho_3]$ | 1.694 |
| 4th | ○ | | ○ | | ○ | | | | $(1+\rho_3)/[(1-\rho_1+\rho_2)/(1+\rho_2)+\rho_3]$ | 1.312 |
| 5th | ○ | ○ | △ | △ | | | | | 1 | 1.000 |
| 6th | | ○ | | ○ | ○ | | | | $(1+\rho_3)/[1+(\rho_1+\rho_2)\rho_3/\rho_2]$ | 0.750 |
| 7th | | ○ | | | ○ | | | | $(1+\rho_3)/[\rho_3((1+\rho_2)/\rho_2)+1]$ | 0.566 |
| R | | | ○ | | ○ | | | ○ | $-(1+\rho_3)\rho_2/(1-\rho_1)\rho_3$ | 2.311 |
○: ENGAGED  ◉: ENGAGED FOR ENGINE BRAKING  △: ENGAGED WITHOUT POWER TRANSMISSION
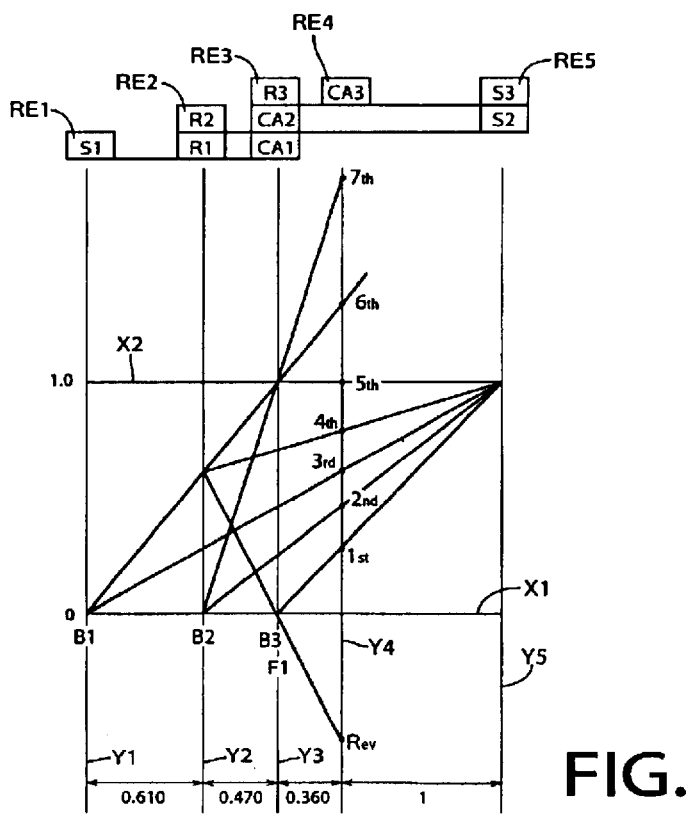
FIG. 36

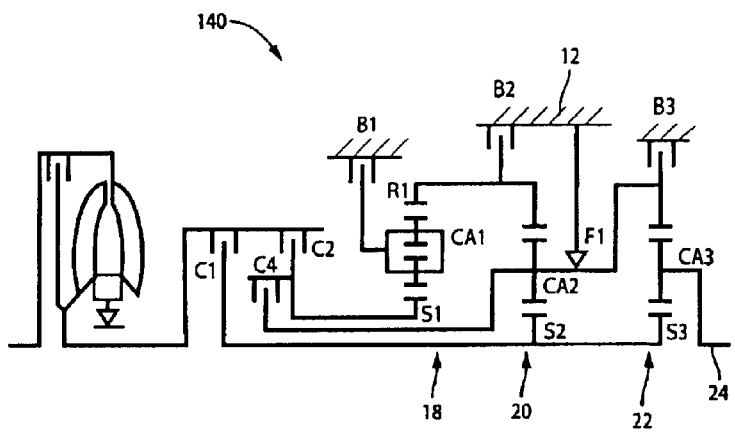

| | C1 | C2 | C4 | B1 | B2 | B3 | F1 | SPEED RATIO ($\rho_1$=0.582, $\rho_2$=0.346, $\rho_3$=0.360) | |
|---|---|---|---|---|---|---|---|---|---|
| 1st | O | | △ | | | ⊚ | O | $1+1/\rho_3$ | 3.778 |
| 2nd | O | | △ | | O | | | $(1+\rho_3)/[\rho_2/(1+\rho_2)+\rho_3]$ | 2.205 |
| 3rd | O | | O | O | | | | $(1+\rho_3)/[\rho_2/(1+\rho_2-\rho_1)+\rho_3]$ | 1.694 |
| 4th | O | O | | O | | | | $(1+\rho_3)/[(\rho_1+\rho_2)/(1+\rho_2)+\rho_3]$ | 1.312 |
| 5th | O | O | O | | | | | 1 | 1.000 |
| 6th | | O | O | O | | | | $(1+\rho_3)/[1+\rho_3(1+\rho_2-\rho_1)/\rho_2]$ | 0.750 |
| 7th | | O | O | | O | | | $(1+\rho_3)/[1+\rho_3(1+\rho_2)/\rho_2]$ | 0.566 |
| R | | O | | O | | O | | $-(1+\rho_3)\rho_2/\rho_2\cdot\rho_3$ | 2.311 |

O: ENGAGED  ⊚: ENGAGED FOR ENGINE BRAKING  △: ENGAGED WITHOUT POWER TRANSMISSION

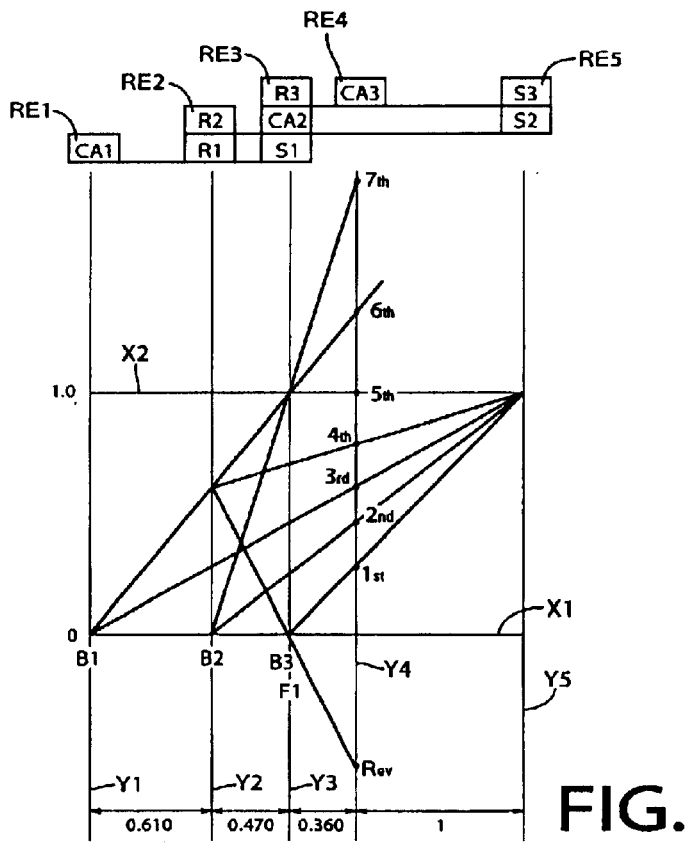

FIG. 39

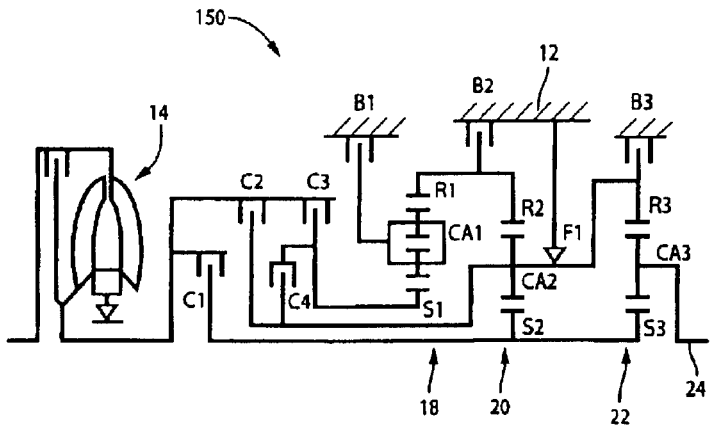

| | C1 | C2 | C3 | C4 | B1 | B2 | B3 | F1 | SPEED RATIO ($\rho_1$=0.582, $\rho_2$=0.346, $\rho_3$=0.360) | |
|---|---|---|---|---|---|---|---|---|---|---|
| 1st | O | | | △ | | | ⊙ | O | $1+1/\rho_3$ | 3.788 |
| 2nd | O | | | △ | | O | | | $(1+\rho_3)/[\rho_2/(1+\rho_2)+\rho_3]$ | 2.205 |
| 3rd | O | | | O | O | | | | $(1+\rho_3)/[\rho_2/(1+\rho_2-\rho_1)+\rho_3]$ | 1.694 |
| 4th | O | | O | | O | | | | $(1+\rho_3)/[(\rho_1+\rho_2)/(1+\rho_2)+\rho_3]$ | 1.312 |
| 5th | O | O | △ | △ | | | | | 1 | 1.000 |
| 6th | | O | | O | O | | | | $(1+\rho_3)/[1+\rho_3(1+\rho_2-\rho_1)/\rho_2]$ | 0.750 |
| 7th | | O | | | | O | | | $(1+\rho_3)/[1+\rho_3(1+\rho_2)/\rho_2]$ | 0.566 |
| R | | | O | | | O | | O | $-(1+\rho_3)\rho_2/\rho_2\cdot\rho_3$ | 2.311 |

O: ENGAGED  ⊙: ENGAGED FOR ENGINE BRAKING  △: ENGAGED WITHOUT POWER TRANSMISSION

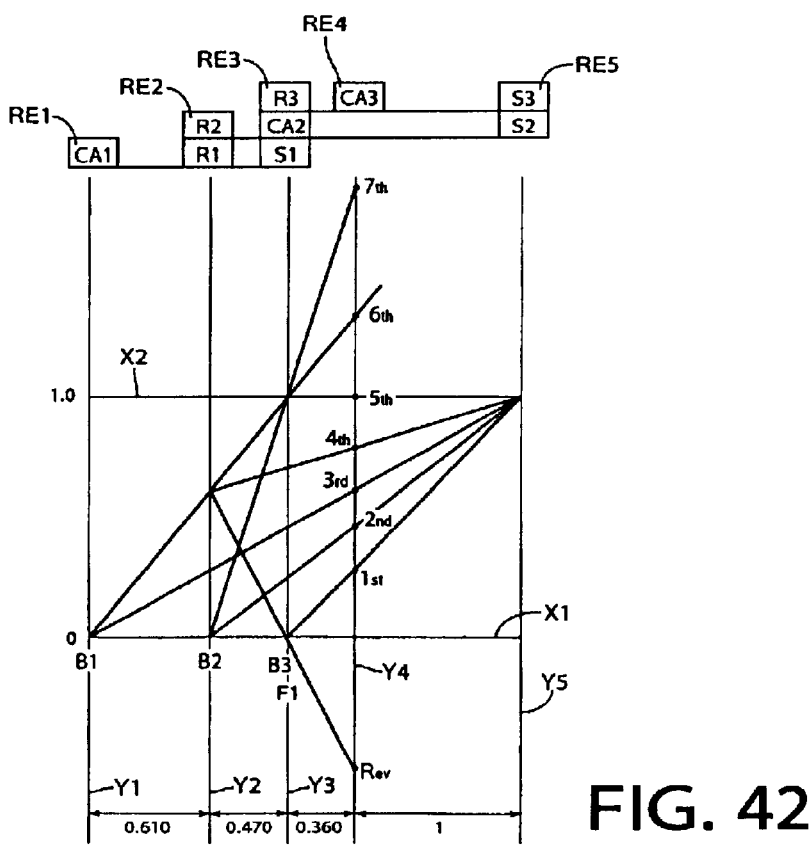

FIG. 42

PLANETARY GEAR TYPE MULTIPLE-STEP TRANSMISSION FOR VEHICLE

This application is based on Japanese Patent Application Nos. 2001-308925, 2001-206471 and 2002-145513 filed Oct. 4, 2001, Jul. 6, 2001 and May 20, 2002, respectively, the contents of which are incorporated hereinto by reference.

BACKGROUND OF THE INVENTION

1. Field of the Invention

The present invention relates to a planetary gear type multiple-step transmission interposed between a drive power source and drive wheels of a vehicle such as an automobile and a railcar.

2. Discussion of Related Art

For vehicles, there are widely used planetary gear type multiple-step transmissions which have a plurality of predetermined speed ratios or operating positions (gear positions) that are selectively established. Such planetary gear type multiple-step transmissions are desired to be not only simple in construction and small in size and to provide a large number of operating positions and a wide range of speed ratio, but also to provide speed ratios that change as geometric series or nearly geometric series.

There has been proposed a planetary gear type multiple-step transmission which has seven operating positions. Representative examples of this kind of planetary gear type multiple-step transmission include a transmission of a third embodiment of FIGS. 5 and 6 and a transmission of a fourth embodiment of FIGS. 7 and 8 of JP-A-2000-266138. Although these transmissions provide a relatively large number of operating positions and a relatively wide range of speed ratio, the transmissions have a large overall length due to the use of four planetary gear sets, and undesirably suffer from a relatively low degree of freedom in its installation on a vehicle.

SUMMARY OF THE INVENTION

It is therefore an object of the present invention to provide a small-sized planetary gear type multiple-step transmission which has a relatively large number of operating positions and a relatively wide range of speed ratio.

The above object may be achieved according to a first aspect of this invention, which provides a planetary gear type multiple-step transmission for a vehicle, having seven forward drive positions for driving the vehicle in a forward direction, the seven forward drive positions including a first-speed, a second-speed, a third-speed, a fourth-speed, a fifth-speed, a sixth-speed and a seventh-speed position, the transmission comprising an input rotary member, an output rotary member, a first, a second and a third planetary gear set each including a sun gear, a carrier and a ring gear, and further comprising a first, a second and a third brake, and a first, a second, a third and a fourth clutch, wherein an improvement comprises:

(a) a first, a second, a third, a fourth and a fifth rotary element each of which is constituted by at least one of the sun gears, carriers and ring gears of the first, second and third planetary gear sets, and rotating speeds of the first, second, third, fourth and fifth rotary elements being represented by respective parallel straight lines of a collinear chart, which lines are arranged in a direction from one of opposite ends of the collinear chart toward the other end, the first rotary element being selectively brought to a stationary state by the first brake, and the second rotary element being selectively brought to a stationary state by the second brake, while the third rotary element being selectively brought to a stationary state by the third brake, the fifth, third and first rotary elements being selectively connected to the input rotary member by the first, second and third clutches, respectively, and the third rotary element being selectively connected to the input rotary member through the second clutch, and the third rotary element rotary element being selectively brought to a disconnected state by the fourth clutch, while the fourth rotary element being connected to the output rotary member; and (b) the first-speed position being established by engaging the first clutch and the third brake, or the first and fourth clutches and the third brake, and the second-speed position being established by first clutch and the second brake, while the third-speed position being established by engaging the first and fourth clutches and the first brake, the fourth-speed position being established by engaging the first and second clutches and the first brake, the fifth-speed positioning being established by engaging the first, second and fourth clutches, the sixth-speed position being established by engaging the second and fourth clutches and the first brake, the seventh-speed position being established by engaging the second and fourth clutches and the second brake.

In a first preferred form of the transmission according to the first aspect of this invention, each of the first, second and third planetary gear sets is a single-pinion type planetary gear set, and the first rotary element consists of the sun gear of the first planetary gear set, and the second rotary element consists of the carrier of the first planetary gear set and the ring gear of the second planetary gear set, while the third rotary element consists of the ring gear of the first planetary set, the carrier of the second planetary gear set and the ring gear of the third planetary gear set, the fourth rotary element consisting of the carrier of the third planetary gear set, and the fifth rotary element consisting of the sun gear and the of the second planetary gear set and the sun gear of the third planetary gear set.

In a second preferred form of the transmission according to the first aspect of the invention, the first planetary gear set is a double-pinion type planetary gear set, while each of the second and third planetary gear sets is a single-pinion type planetary gear set, and the first rotary element consists of the sun gear of the first planetary gear set, and the second rotary element consists of the ring gear of the first planetary gear set and the ring gear of the second planetary gear set, while the third rotary element consists of the carrier of the first planetary set, the carrier of the second planetary gear set and the ring gear of the third planetary gear set, the fourth rotary element consisting of the carrier of the third planetary gear set, and the fifth rotary element consisting of the sun gear and the of the second planetary gear set and the sun gear of the third planetary gear set.

In a third preferred form of the transmission according to the first aspect of this invention, the first planetary gear set is a double-pinion type planetary gear set, while each of the second and third planetary gear sets is a single-pinion type planetary gear set, and the first rotary element consists of the carrier of the first planetary gear set, and the second rotary element consists of the ring gear of the first planetary gear set and the ring gear of the second planetary gear set, while the third rotary element consists of the sun gear of the first planetary set, the carrier of the second planetary gear set and the ring gear of the third planetary gear set, the fourth rotary element consisting of the carrier of the third planetary gear set, and the fifth rotary element consisting of the sun gear and the of the second planetary gear set and the sun gear of the third planetary gear set.

In the planetary gear type multiple-step transmission according to the first aspect of the present invention described above, the first, second and third planetary gear sets are arranged to provide providing a sufficiently wide range of speed ratio, thereby permitting not only high-speed running of the vehicle, but also stable starting of the vehicle on an uphill road, without an increase of the required size of the transmission.

In one advantageous arrangement of the first, second and third preferred forms of the first aspect of the invention described above, the transmission further has a rear drive position for driving the vehicle in a reverse direction, the rear drive position being established by engaging the third and fourth clutches and the third brake, the first, second and third planetary gear sets having respective gear ratios which are determined such that the rear drive position has a speed ratio between those of the first-speed and second-speed positions. In this arrangement, the rear drive position having a speed ratio which is lower than that of the first-speed position and higher than that of the second-speed position can be established by engaging actions of the third and fourth clutches and the third brake.

In another advantageous arrangement of the second and third preferred form of the first aspect of the invention described above, the transmission further has a rear drive position for driving the vehicle in a reverse direction, the rear drive position being established by engaging the second clutch and the first and third brakes, and the first, second and third planetary gear sets have respective gear ratios which are determined such that the rear drive position has a speed ratio between those of the first-speed and second-speed positions. In this arrangement, the rear drive position having a speed ratio which is lower than that of the first-speed position and higher than that of the second-speed position can be established by engaging actions of the second clutch and the first and third brakes.

In a further advantageous arrangement of the second and third preferred forms of the first aspect of the invention described above, the transmission further has a rear drive position for driving the vehicle in a reverse direction, the rear drive position being established by engaging the third clutch and the first and third brakes, and the first, second and third planetary gear sets have respective gear ratios which are determined such that the rear drive position has a speed ratio between those of the first-speed and second-speed positions. In this arrangement, the rear drive position having a speed ratio which is lower than that of the first-speed position and higher than that of the second-speed position can be established by engaging actions of the third clutch and the first and third brakes.

In a further preferred form of the transmission according to the first aspect of the invention, the first, second and third planetary gear sets are arranged between the input and output shafts. According to this form of the invention, the transmission can be made small-sized, yet permitting not only high-speed running of the vehicle, but also stable starting of the vehicle on an uphill road.

In a still further preferred form of the transmission according to the first aspect of the invention, an output of an engine of the vehicle is transmitted to the input shaft through a torque converter. This form of the invention provides a compact automatic transmission.

In a yet further preferred form of the first aspect of the invention described above, the transmission further comprises a one-way clutch disposed in parallel with one of the first, second, third and fourth clutches and the first, second and third brakes. This form of the invention permits easier control of shifting actions of the transmission. For instance, the one-way clutch is disposed in parallel with the third brake disposed between the third ring gear and the stationary rotary member. In this instance, the first-speed position is established by engaging the third brake, such that an engine brake application to the vehicle in this first-speed position is inhibited if the one-way clutch is engaged.

The object indicated above may also be achieved according to a second aspect of the present invention, which provides a planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein the first planetary gear set including a first sun gear, a first planetary gear, a first carrier rotatably supporting the first planetary gear, and a first ring gear meshing with the first sun gear through the first planetary gear, the second planetary gear set including a second sun gear, a second planetary gear, a second carrier rotatably supporting the second planetary gear, and a second ring gear meshing with the second sun gear through the second planetary gear, the third planetary gear set including a third sun gear, a third planetary gear, a third carrier rotatably supporting the third planetary gear, and a third ring gear meshing with the third sun gear through the third planetary gear, the transmission being operable to transmit a rotary motion of the input rotary member to the output rotary member such that a ratio of the speed of the input rotary member to the speed of the output rotary member is variable in steps, wherein an improvement comprises:

the first carrier and the second ring gear being connected to each other;

the first ring gear and the second carrier being connected to each other through the fourth clutch;

the second carrier and the third ring gear being connected to each other while the second and third sun gears being connected to each other;

the input rotary member being connected to the first sun gear through the third clutch;

the input rotary member being connected to the first ring gear through the second clutch;

the input rotary member being connected to the second and third sun gears through the first clutch;

the first brake being disposed between the stationary rotary member and the first sun gear;

the second brake being disposed between the stationary rotary member and the first carrier;

the third brake being disposed between the third ring gear and the stationary rotary member; and the output rotary member is connected to the third carrier.

In one preferred form of the second aspect of the invention described above, the transmission has seven forward drive positions for driving the vehicle in a forward direction, the seven forward drive positions including a first-speed position having a highest speed ration, a second-speed position having a speed ratio lower than that of the first-speed position, a third-speed position having a speed ratio lower than that of the second-speed position, a fourth-speed position having a speed ratio lower than that of the third-speed position, a fifth-speed position having a speed ratio lower than that of the fourth-speed position, a sixth-speed position having a speed ration lower than that of the fifth-speed position, and a seventh-speed position having a speed ratio lower than that of the sixth-speed ratio, and wherein the first-speed position is established by engaging the first clutch and the third brake to connect the input rotary member to the second and third sun gears, and to connect the third ring gear and the stationary rotary member to each other, the second-speed position being established by engaging the first clutch and the second brake to connect the input rotary member to the second and third sun gears, and to connect the first carrier and the stationary rotary member to each other, the third-speed position being established by engaging the first clutch and the first brake to connect the input rotary member to the second and third sun gears, and to connect the first sun gear and the stationary rotary member to each other, the fourth-speed position being established by engaging the first and second clutches and the first brake to connect the input rotary member to the second and third sun gears, to connect the input rotary member to the first ring gear, and to connect the first sun gear and the stationary rotary member, the fifth-speed position being established by engaging the first, second and fourth clutches to connect the input rotary member to the second and third sun gears, to connect the input rotary member to the first ring gear, and to connect the first ring gear and the second carrier.

the sixth-speed position being established by engaging the second and fourth clutches and the first brake to connect the input rotary member to the first ring gear, to connect the first ring gear and the second carrier to each other, and to connect the first sun gear and the stationary rotary member, and the seventh-speed position beings established by engaging the second and fourth clutches and the second brake to connect the input rotary member to the first ring gear, to connect the first ring gear and the second carrier, and to connect the second carrier and the stationary rotary member to each other.

The object indicated above may also be achieved according to a third aspect of this invention, which provides a planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein the first planetary gear set including a first sun gear, a first planetary gear, a first carrier rotatably supporting the first planetary gear, and a first ring gear meshing with the first sun gear through the first planetary gear, the second planetary gear set including a second sun gear, a second planetary gear, a second carrier rotatably supporting the second planetary gear, and a second ring gear meshing with the second sun gear through the second planetary gear, the third planetary gear set including a third sun gear, a third planetary gear, a third carrier rotatably supporting the third planetary gear, and a third ring gear meshing with the third sun gear through the third planetary gear, the transmission being operable to transmit a rotary motion of the input rotary member to the output rotary member such that a ratio of the speed of the input rotary member to the speed of the output rotary member is variable in steps, wherein an improvement comprises:

the first and second carriers and the third ring gear being connected to each other;

the first and second ring gears being connected to each other;

the second and third sun gears being connected to each other;

the input rotary member being connected to the second and third sun gears through the first clutch:

the input rotary member being connected to the first carrier, or to an assembly of the first and second carriers and the third ring gear, through the second clutch;

the input rotary member being connected to the first sun gear through the third clutch;

the fourth clutch being disposed between the first and second carriers;

the first brake being disposed between the first sun gear and the stationary rotary member;

the second brake being disposed between the stationary rotary member and an assembly of the first and second ring gears;

the third brake being disposed between the stationary rotary member and an assembly of the first and second carriers and the third ring gear; and the third carrier being connected to the output rotary member.

In one preferred form of the third aspect of this invention described above, the transmission has seven forward drive positions for driving the vehicle in a forward direction, the seven forward drive positions including a first-speed position having a highest speed ration, a second-speed position having a speed ratio lower than that of the first-speed position, a third-speed position having a speed ratio lower than that of the second-speed position, a fourth-speed position having a speed ratio lower than that of the third-speed position, a fifth-speed position having a speed ratio lower than that of the fourth-speed position, a sixth-speed position having a speed ration lower than that of the fifth-speed position, and a seventh-speed position having a speed ratio lower than that of the sixth-speed ratio, and wherein the first-speed position is established by engaging the first clutch and the third brake to connect the input rotary member to the second and third sun gears, and to connect the third ring gear and the stationary rotary member to each other, the second-speed position being established by engaging the first clutch and the second brake to connect the input rotary member to the second and third sun gears, and to connect the first and second ring gears to the stationary rotary member to each other, the third-speed position being established by engaging the first and fourth clutches and the first brake to connect the input rotary member to the second and third sun gears, to connect the first and second carriers to each other, and to connect the first sun gear and the stationary rotary member to each other, the fourth-speed position being established by engaging the first and second clutches and the first brake to connect the input rotary member to the second and third sun gears, to connect the input rotary member to the first or second carrier, and to connect the first sun gear and the stationary rotary member to each other, the fifth-speed position being established by engaging the first, second and fourth clutches to connect the input rotary member to the second and third sun gears, to connect the input rotary member to the first or second carrier, and to connect the first and second carriers to each other, the sixth-speed position being established by engaging the second and fourth clutches and the first brake to connect the input rotary member to the first or second carrier, to connect the first and second carriers to each other, and to connect the first sun gear and the stationary rotary member, and the seventh-speed position being established by engaging the second and fourth clutches and the second brake to connect the input rotary member to the first or second carrier, to connect the first and second carriers to each other, and to connect the first and second ring gear to the stationary rotary member to each other.

The object indicated above may also be achieved according to a fourth aspect of the present invention, which provides a planetary gear type multiple-step transmission for a vehicle, comprising a stationary rotary member, an input rotary member, an output rotary member, a first, a second and a third planetary gear set which are disposed coaxially with each other, a first, a second, and a fourth clutch, and a first, a second and a third brake, and wherein the first planetary gear set including a first sun gear, a first planetary gear, a first carrier rotatably supporting the first planetary gear, and a first ring gear meshing with the first sun gear through the first planetary gear, the second planetary gear set including a second sun gear, a second planetary gear, a second carrier rotatably supporting the second planetary gear, and a second ring gear meshing with the second sun gear through the second planetary gear, the third planetary gear set including a third sun gear, a third planetary gear, a third carrier rotatably supporting the third planetary gear, and a third ring gear meshing with the third sun gear through the third planetary gear, the transmission being operable to transmit a rotary motion of the input rotary member to the output rotary member such that a ratio of the speed of the input rotary member to the speed of the output rotary member is variable in steps, wherein an improvement comprises:

the second carrier and the third ring gear being connected to each other;

the first and second ring gears being connected to each other;

the second and third sun gears being connected to each other;

the input rotary member being connected to the second and third sun gears through the first clutch;

the input rotary member being connected to the first carrier through the second clutch;

the fourth clutch being disposed between the first and second carriers;

the first brake being disposed between the first sun gear and the stationary rotary member;

the second brake being disposed between the first and second ring gears;

the third brake being disposed between the second carrier and the third ring gear; and the third carrier being connected to the output rotary member.

In one preferred form of the fourth aspect of the invention described above, the transmission has seven forward drive positions for driving the vehicle in a forward direction, the seven forward drive positions including a first-speed position having a highest speed ration, a second-speed position having a speed ratio lower than that of the first-speed position, a third-speed position having a speed ratio lower than that of the second-speed position, a fourth-speed position having a speed ratio lower than that of the third-speed position, a fifth-speed position having a speed ratio lower than that of the fourth-speed position, a sixth-speed position having a speed ration lower than that of the fifth-speed position, and a seventh-speed position having a speed ratio lower than that of the sixth-speed ratio, and wherein the first-speed position is established by engaging the first clutch and the third brake to connect the input rotary member to the second and third sun gears, and to connect the third ring gear and the stationary rotary member to each other, the second-speed position being established by engaging the first clutch and the second brake to connect the input rotary member to the second and third sun gears, and to connect the first and second ring gears to the stationary rotary member to each other, the third-speed position being established by engaging the first and fourth clutches and the first brake to connect the input rotary member to the second and third sun gears, to connect the first and second carriers to each other, and to connect the first sun gear and the stationary rotary member to each other, the fourth-speed position being established by engaging the first and second clutches and the first brake to connect the input rotary member to the second and third sun gears, to connect the input rotary member to the first carrier, and to connect the first sun gear and the stationary rotary member to each other, the fifth-speed position being established by engaging the first, second and fourth clutches to connect the input rotary member to the second and third sun gears, to connect the input rotary member to the first carrier, and to connect the first and second carriers to each other, the sixth-speed position being established by engaging the second and fourth clutches and the first brake to connect the input rotary member to the first carrier, to connect the first and second carriers to each other, and to connect the first sun gear and the stationary rotary member, and the seventh-speed position being established by engaging the second and fourth clutches and the second brake to connect the input rotary member to the first carrier, to connect the first and second carriers to each other, and to connect the first and second ring gear to the stationary rotary member to each other.

The object indicated above may also be achieved according to a fifth aspect of this invention, which provides a planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein the first planetary gear set including a first sun gear, a first planetary gear, a first carrier rotatably supporting the first planetary gear, and a first ring gear meshing with the first sun gear through the first planetary gear, the second planetary gear set including a second sun gear, a second planetary gear, a second carrier rotatably supporting the second planetary gear, and a second ring gear meshing with the second sun gear through the second planetary gear, the third planetary gear set including a third sun gear, a third planetary gear, a third carrier rotatably supporting the third planetary gear, and a third ring gear meshing with the third sun gear through the third planetary gear, the transmission being operable to transmit a rotary motion of the input rotary member to the output rotary member such that a ratio of the speed of the input rotary member to the speed of the output rotary member is variable in steps, wherein an improvement comprises:

the second carrier and the third ring gear being connected to each other;

the first and second ring gears are connected to each other; the second and third sun gears being connected to each other;

the input rotary member being connected to the second and third sun gears through the first clutch;

the input rotary member being connected to the second carrier and the third ring gear through the second clutch;

the input rotary member being connected to the first carrier through the third clutch;

the fourth clutch being disposed between the first and second carriers;

the first brake being disposed between the first sun gear and the stationary rotary member;

the second brake being disposed between the first and second ring gears;

the third brake being disposed between the second carrier and the third ring gear; and the third carrier being connected to the output rotary member.

In one preferred form of the fifth aspect of the invention described above, the transmission has seven forward drive positions for driving the vehicle in a forward direction, the seven forward drive positions including a first-speed position having a highest speed ration, a second-speed position having a speed ratio lower than that of the first-speed position, a third-speed position having a speed ratio lower than that of the second-speed position, a fourth-speed position having a speed ratio lower than that of the third-speed position, a fifth-speed position having a speed ratio lower than that of the fourth-speed position, a sixth-speed position having a speed ration lower than that of the fifth-speed position, and a seventh-speed position having a speed ratio lower than that of the sixth-speed ratio, and wherein the first-speed position is established by engaging the first clutch and the third brake to connect the input rotary member to the second and third sun gears, and to connect the third ring gear and the stationary rotary member to each other, the second-speed position being established by engaging the first clutch and the second brake to connect the input rotary member to the second and third sun gears, and to connect the first and second ring gears to the stationary rotary member to each other, the third-speed position being established by engaging the first and fourth clutches and the first brake to connect the input rotary member to the second and third sun gears, to connect the first and second carriers to each other, and to connect the first sun gear and the stationary rotary member to each other, the fourth-speed position being established by engaging the first and third clutches and the first brake to connect the input rotary member to the second and third sun gears, to connect the input rotary member to the first carrier, and to connect the first sun gear and the stationary rotary member to each other, the fifth-speed position being established by engaging the first and second clutches to connect the input rotary member to the second and third sun gears and to connect the input rotary member to the second carrier, the sixth-speed position being established by engaging the second and fourth clutches and the first brake to connect the input rotary member to the second carrier, to connect the first and second carriers to each other, and to connect the first sun gear and the stationary rotary member, and the seventh-speed position being established by engaging the second clutch and the second brake to connect the input rotary member to the second carrier, to connect the first and second ring gears to the stationary rotary member to each other.

The object indicated above may also be achieved according to a sixth aspect of this invention, which provides a planetary gear type multiple-step transmission for a vehicle, comprising a stationary rotary member, an input rotary member, an output rotary member, a first, a second and a third planetary gear set which are disposed coaxially with each other, a first, a second, and a fourth clutch, and a first, a second and a third brake, and wherein the first planetary gear set including a first sun gear, a first planetary gear, a first carrier rotatably supporting the first planetary gear, and a first ring gear meshing with the first sun gear through the first planetary gear, the second planetary gear set including a second sun gear, a second planetary gear, a second carrier rotatably supporting the second planetary gear, and a second ring gear meshing with the second sun gear through the second planetary gear, the third planetary gear set including a third sun gear, a third planetary gear, a third carrier rotatably supporting the third planetary gear, and a third ring gear meshing with the third sun gear through the third planetary gear, the transmission being operable to transmit a rotary motion of the input rotary member to the output rotary member such that a ratio of the speed of the input rotary member to the speed of the output rotary member is variable in steps, wherein an improvement comprises:

the second carrier and the third ring gear being connected to each other;

the first and second ring gears being connected to each other;

the second and third sun gears being connected to each other;

the input rotary member being connected to the second and third sun gears through the first clutch;

the input rotary member being connected to the first sun gear through the second clutch;

the fourth clutch being disposed between the first sun gear and the second carrier;

the first brake being disposed between the first carrier and the stationary rotary member;

the second brake being disposed between the first and second ring gears;

the third brake being disposed between the second carrier and the third ring gear; and the third carrier being connected to the output rotary member.

In one preferred form of the sixth aspect of the invention described above, the transmission has seven forward drive positions for driving the vehicle in a forward direction, the seven forward drive positions including a first-speed position having a highest speed ration, a second-speed position having a speed ratio lower than that of the first-speed position, a third-speed position having a speed ratio lower than that of the second-speed position, a fourth-speed position having a speed ratio lower than that of the third-speed position, a fifth-speed position having a speed ratio lower than that of the fourth-speed position, a sixth-speed position having a speed ration lower than that of the fifth-speed position, and a seventh-speed position having a speed ratio lower than that of the sixth-speed ratio, and wherein the first-speed position is established by engaging the first clutch and the third brake to connect the input rotary member to the second and third sun gears, and to connect the third ring gear and the stationary rotary member to each other, the second-speed position being established by engaging the first clutch and the second brake to connect the input rotary member to the second and third sun gears, and to connect the first and second ring gears to the stationary rotary member to each other, the third-speed position being established by engaging the first and fourth clutches and the first brake to connect the input rotary member to the second and third sun gears, to connect the first and second carriers to each other, and to connect the first sun gear and the stationary rotary member to each other, the fourth-speed position being established by engaging the first and second clutches and the first brake to connect the input rotary member to the second and third sun gears, to connect the input rotary member to the first carrier, and to connect the first carrier and the stationary rotary member to each other, the fifth-speed position being established by engaging the first, second and fourth clutches to connect the input rotary member to the second and third sun gears, to connect the input rotary member to the first sun gear, and to connect the first sun gear and the second carrier, the sixth-speed position being established by engaging the second and fourth clutches and the first brake to connect the input rotary member to the first sun gear, to connect the first sun gear and the second carrier to each other, and to connect the first carrier and the stationary rotary member to each other, and the seventh-speed position being established by engaging the second and fourth clutches and the second brake to connect the input rotary member to the first sun gear, to connect the first sun gear and the second carrier to each other, and to connect the first and second ring gears to the stationary rotary member.

The object indicated above may also be achieved according to a seventh aspect of the present invention, which provides a planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein the first planetary gear set including a first sun gear, a first planetary gear, a first carrier rotatably supporting the first planetary gear, and a first ring gear meshing with the first sun gear through the first planetary gear, the second planetary gear set including a second sun gear, a second planetary gear, a second carrier rotatably supporting the second planetary gear, and a second ring gear meshing with the second sun gear through the second planetary gear, the third planetary gear set including a third sun gear, a third planetary gear, a third carrier rotatably supporting the third planetary gear, and a third ring gear meshing with the third sun gear through the third planetary gear, the transmission being operable to transmit a rotary motion of the input rotary member to the output rotary member such that a ratio of the speed of the input rotary member to the speed of the output rotary member is variable in steps, wherein an improvement comprises:

the second carrier and the third ring gear being connected to each other;

the first and second ring gears being connected to each other;

the second and third sun gears being connected to each other;

the input rotary member being connected to the second and third sun gears through the first clutch;

the input rotary member being connected to the second carrier and the third ring gear through the second clutch;

the input rotary member being connected to the first sun gear through the third clutch;

the fourth clutch being disposed between the first sun gear and the second carrier;

the first brake being disposed between the first carrier and the stationary rotary member;

the second brake being disposed between the first and second ring gears;

the third brake being disposed between the second carrier and the third ring gear; and the third carrier being connected to the output rotary member.

In one preferred form of the seventh aspect of the invention described above, the transmission has seven forward drive positions for driving the vehicle in a forward direction, the seven forward drive positions including a first-speed position having a highest speed ration, a second-speed position having a speed ratio lower than that of the first-speed position, a third-speed position having a speed ratio lower than that of the second-speed position, a fourth-speed position having a speed ratio lower than that of the third-speed position, a fifth-speed position having a speed ratio lower than that of the fourth-speed position, a sixth-speed position having a speed ration lower than that of the fifth-speed position, and a seventh-speed position having a speed ratio lower than that of the sixth-speed ratio, and wherein the first-speed position is established by engaging the first clutch and the third brake to connect the input rotary member to the second and third sun gears, and to connect the third ring gear and the stationary rotary member to each other, the second-speed position being established by engaging the first clutch and the second brake to connect the input rotary member to the second and third sun gears, and to connect the first and second ring gears to the stationary rotary member to each other, the third-speed position being established by engaging the first and fourth clutches and the first brake to connect the input rotary member to the second and third sun gears, to connect the first sun gear and the second carrier to each other, and to connect the first carrier and the stationary rotary member to each other, the fourth-speed position being established by engaging the first and third clutches and the first brake to connect the input rotary member to the second and third sun gears, to connect the input rotary member to the first sun gear, and to connect the first carrier and the stationary rotary member to each other, the fifth-speed position being established by engaging the first and second clutches to connect the input rotary member to the second and third sun gears, and to connect the input rotary member and the second carrier to each other, the sixth-speed position being established by engaging the second and fourth clutches and the first brake to connect the input rotary member to the second carrier, to connect the first sun gear and the second carrier to each other, and to connect the first carrier and the stationary rotary member to each other, and the seventh-speed position being established by engaging the second clutch and the second brake to connect the input rotary member to the second carrier, and to connect the first and second ring gears to the stationary rotary member.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which:

FIG. 1 is a schematic view illustrating a basic arrangement of a vehicle planetary gear type multiple-step transmission according to one embodiment of the present invention;

FIG. 2 is a view indicating a relationship between operating positions of the multiple-step transmission of FIG. 1 and combinations of operating states of hydraulically operated frictional coupling devices to establish the respective operating positions;

FIG. 3 is a collinear chart showing relative rotating speeds of a plurality of rotary elements incorporated in the multiple-step transmission of FIG. 1;

FIG. 4 is a schematic view corresponding to that of FIG. 1, illustrating a basic arrangement of a vehicle planetary gear type multiple-step transmission according to another embodiment of the present invention;

FIG. 5 is a view corresponding to that of FIG. 2, indicating a relationship between operating positions of the multiple-step transmission of FIG. 4 and combinations of operating states of hydraulically operated frictional coupling devices to establish the respective operating positions;

FIG. 6 is a collinear chart corresponding to that of FIG. 3, showing relative rotating speeds of a plurality of rotary elements incorporated in the multiple-step transmission of FIG. 4;

FIG. 7 is a schematic view corresponding to that of FIG. 1, illustrating a basic arrangement of a vehicle planetary gear type multiple-step transmission according to a further embodiment of the present invention;

FIG. 8 is a view corresponding to that of FIG. 2, indicating a relationship between operating positions of the multiple-step transmission of FIG. 7 and combinations of operating states of hydraulically operated frictional coupling devices to establish the respective operating positions;

FIG. 9 is a collinear chart corresponding to that of FIG. 3, showing relative rotating speeds of a plurality of rotary elements incorporated in the multiple-step transmission of FIG. 7; FIG. 1, illustrating a basic arrangement of a vehicle planetary gear type multiple-step transmission according to a further embodiment of the present invention;

FIG. 10 is a schematic view corresponding to that of FIG. 1, illustrating a basic arrangement of a vehicle planetary gear type multiple-step transmission according to a still further embodiment of the present invention;

FIG. 11 is a view corresponding to that of FIG. 2, indicating a relationship between operating positions of the multiple-step transmission of FIG. 10 and combinations of operating states of hydraulically operated frictional coupling devices to establish the respective operating positions;

FIG. 12 is a collinear chart corresponding to that of FIG. 3, showing relative rotating speeds of a plurality of rotary elements incorporated in the multiple-step transmission of FIG. 10;

FIG. 13 is a schematic view corresponding to that of FIG. 1, illustrating a basic arrangement of a vehicle planetary gear type multiple-step transmission according to a yet further embodiment of the present invention;

FIG. 14 is a view corresponding to that of FIG. 2, indicating a relationship between operating positions of the multiple-step transmission of FIG. 13 and combinations of operating states of hydraulically operated frictional coupling devices to establish the respective operating positions;

FIG. 15 is a collinear chart corresponding to that of FIG. 3, showing relative rotating speeds of a plurality of rotary elements incorporated in the multiple-step transmission of FIG. 13;

FIG. 16 is a schematic view corresponding to that of FIG. 1, illustrating a basic arrangement of a vehicle planetary gear type multiple-step transmission according to still another further embodiment of the present invention;

FIG. 17 is a view corresponding to that of FIG. 2, indicating a relationship between operating positions of the multiple-step transmission of FIG. 16 and combinations of operating states of hydraulically operated frictional coupling devices to establish the respective operating positions;

FIG. 18 is a collinear chart corresponding to that of FIG. 3, showing relative rotating speeds of a plurality of rotary elements incorporated in the multiple-step transmission of FIG. 16;

FIG. 19 is a schematic view corresponding to that of FIG. 1, illustrating a basic arrangement of a vehicle planetary gear type multiple-step transmission according to yet another further embodiment of the present invention;

FIG. 20 is a view corresponding to that of FIG. 2, indicating a relationship between operating positions of the multiple-step transmission of FIG. 19 and combinations of operating states of hydraulically operated frictional coupling devices to establish the respective operating positions;

FIG. 21 is a collinear chart corresponding to that of FIG. 3, showing relative rotating speeds of a plurality of rotary elements incorporated in the multiple-step transmission of FIG. 19;

FIG. 22 is a schematic view corresponding to that of FIG. 1, illustrating a basic arrangement of a vehicle planetary gear type multiple-step transmission according to a further embodiment of t he present invention;

FIG. 23 is a view corresponding to that of FIG. 2, indicating a relationship between operating positions of the multiple-step transmission of FIG. 22 and combinations of operating states of hydraulically operated frictional coupling devices to establish the respective operating positions;

FIG. 24 is a collinear chart corresponding to that of FIG. 3, showing relative rotating speeds of a plurality of rotary elements incorporated in the multiple-step transmission of FIG. 22;

FIG. 25 is a schematic view corresponding to that of FIG. 1, illustrating a basic arrangement of a vehicle planetary gear type multiple-step transmission according to a still further embodiment of the present invention;

FIG. 26 is a view corresponding to that of FIG. 2, indicating a relationship between operating positions of the multiple-step transmission of FIG. 25 and combinations of operating states of hydraulically operated frictional coupling devices to establish the respective operating positions;

FIG. 27 is a collinear chart corresponding to that of FIG. 3, showing relative rotating speeds of a plurality of rotary elements incorporated in the multiple-step transmission of FIG. 25;

FIG. 28 is a schematic view illustrating a basic arrangement of a vehicle planetary gear type multiple-step transmission according to a yet further embodiment of the present invention;

FIG. 29 is a view corresponding to that of FIG. 2, indicating a relationship between operating positions of the multiple-step transmission of FIG. 28 and combinations of operating states of hydraulically operated frictional coupling devices to establish the respective operating positions;

FIG. 30 is a collinear chart corresponding to that of FIG. 3, showing relative rotating speeds of a plurality of rotary elements incorporated in the multiple-step transmission of FIG. 28;

FIG. 31 is a schematic view illustrating a basic arrangement of a vehicle planetary gear type multiple-step transmission according to still another embodiment of the present invention;

FIG. 32 is a view corresponding to that of FIG. 2, indicating a relationship between operating positions of the multiple-step transmission of FIG. 31 and combinations of operating states of hydraulically operated frictional coupling devices to establish the respective operating positions;

FIG. 33 is a collinear chart corresponding to that of FIG. 3, showing relative rotating speeds of a plurality of rotary elements incorporated in the multiple-step transmission of FIG. 31;

FIG. 34 is a schematic view illustrating a basic arrangement of a vehicle planetary gear type multiple-step transmission according to yet another embodiment of the present invention;

FIG. 35 is a view corresponding to that of FIG. 2, indicating a relationship between operating positions of the multiple-step transmission of FIG. 34 and combinations of operating states of hydraulically operated frictional coupling devices to establish the respective operating positions;

FIG. 36 is a collinear chart corresponding to that of FIG. 3, showing relative rotating speeds of a plurality of rotary elements incorporated in the multiple-step transmission of FIG. 34;

FIG. 37 is a schematic view illustrating a basic arrangement of a vehicle planetary gear type multiple-step transmission according to still another embodiment of the present invention;

FIG. 38 is a view corresponding to that of FIG. 2, indicating a relationship between operating positions of the multiple-step transmission of FIG. 37 and combinations of operating states of hydraulically operated frictional coupling devices to establish the respective operating positions;

FIG. 39 is a collinear chart corresponding to that of FIG. 3, showing relative rotating speeds of a plurality of rotary elements incorporated in the multiple-step transmission of FIG. 37;

FIG. 40 is a schematic view illustrating a basic arrangement of a vehicle planetary gear type multiple-step transmission according to a further embodiment of the present invention;

FIG. 41 is a view corresponding to that of FIG. 2, indicating a relationship between operating positions of the multiple-step transmission of FIG. 40 and combinations of operating states of hydraulically operated frictional coupling devices to establish the respective operating positions;

FIG. 42 is a collinear chart corresponding to that of FIG. 3, showing relative rotating speeds of a plurality of rotary elements incorporated in the multiple-step transmission of FIG. 42.

DETAILED DESCRIPTION OF THE PREFERRED EMBODIMENTS

Figure 43:
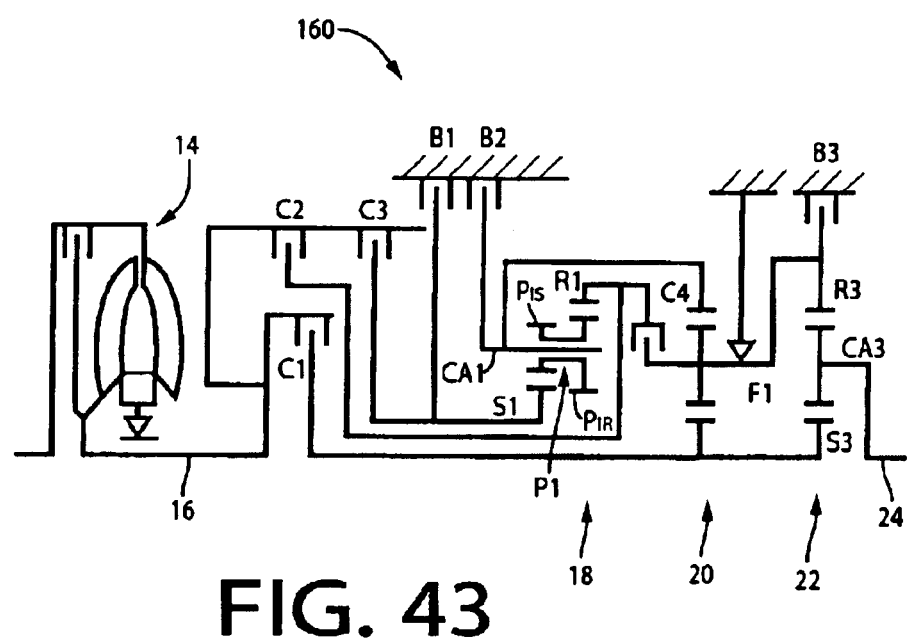
FIG. 43 is a schematic view illustrating a modification of the vehicle planetary gear type multiple-step transmission of FIG. 1, wherein the planetary gear of the first planetary gear set is constituted by a stepped pinion.

Referring to first to the schematic view of FIG. 1, there is illustrated a basic arrangement of a vehicle automatic transmission in the form of a vehicle planetary gear type multiple-step transmission (hereinafter referred to simply as "transmission") 10. As shown in FIG. 1, the transmission 10 has a transmission casing 12 to be fixed to the body of the vehicle, and includes a torque converter 14 with a lock-up clutch 13, an input shaft 16, a first planetary gear set 18, a second planetary gear set 20, a third planetary gear set 22 and an output shaft 24, which are disposed coaxially with each other within the transmission casing 12, in the order of description, such that the gear sets 18, 20, 22 are arranged between the input and output shafts 16, 24. The input shaft 16 is connected to the torque converter 14, which in turn is connected to a crankshaft (not shown) of an engine (not shown) of the vehicle. In the present embodiment, the input shaft 16 and the output shaft 24 function as an input rotary member and an output rotary member, while the transmission casing 12 functions as a stationary or non-rotary member. Since the transmission 10 is constructed symmetrically with respect to its axis, the lower half of the transmission 10 located below the axis is omitted in the schematic view of FIG. 1.

Each of the first, second and third planetary gear sets 18, 20, 22 shown in FIG. 1 is a well known planetary gear device of single-pinion type. The first planetary gear set 18 includes a first sun gear S1, a first planetary gear P1, a first carrier CA1 supporting the first planetary gear P1, and a first ring gear R1 meshing with the first sun gear S1 through the first planetary gear P1. The first carrier CA1 supports the first planetary gear P1 such that the first planetary gear P1 is rotatable about its axis and is rotatable about the axis of the first sun gear S1. The first planetary gear set 18 has a predetermined gear ratio $\rho_1$, for instance, about 0.551. The second planetary gear set 20 includes a second sun gear S2, a second planetary gear P2, a second carrier CA2 supporting the second planetary gear P2, and a second ring gear R2 meshing with the second sun gear S2 through the second planetary gear P2. The second carrier CA2 supports the second planetary gear P2 such that the second planetary gear P2 is rotatable about its axis and is rotatable about the axis of the second sun gear S2. The second planetary gear set 20 has a predetermined gear ratio $\rho_2$, for instance, about 0.326. The third planetary gear set 22 includes a third sun gear S3, a third planetary gear P2, a third carrier CA3 supporting the third planetary gear P3, and a third ring gear R3 meshing with the third sun gear S3 through the third planetary gear P3. The third carrier CA3 supports the third planetary gear P3 such that the third planetary gear P3 is rotatable about its axis and is rotatable about the axis of the third sun gear S3. The third planetary gear set 22 has a predetermined gear ratio $\rho_3$, for instance, about 0.320. If the numbers of teeth of the first sun gear S1, first ring gear R1, second sun gear S2, second ring gear R2, third sun gear S3 and third ring gear R3 are represented by $Z_{18s}$, $Z_{18r}$, $Z_{20s}$, $Z_{20r}$, $Z_{22s}$ and $Z_{22r}$, respectively, the above-indicated gear ratios $\rho_1$, $\rho_2$ and $\rho_3$ are represented by $Z_{18s}/Z_{18r}$, $Z_{20s}/Z_{20r}$, and $Z_{22s}/Z_{22r}$, respectively.

In the transmission 10 described above, the first carrier CA1 and the second ring gear R2 are integrally connected to each other, and the first ring gear R1 and the second carrier CA2 are connected to each other through a fourth clutch C4. The second carrier CA2 and the third ring gear R3 are connected to each other, while the second sun gear S2 and the third sun gear S3 are connected to each other. The input shaft 16 is connected to the first sun gear S1 through a third clutch C3, to the first ring gear R1 through a second clutch C2, and to the second and third sun gears S2, S3 through a first clutch C1. A first brake B1 is disposed between the first sun gear S1 and the transmission casing 12, and a second brake B2 is disposed between the first carrier CA1 and the transmission casing 12, while a third brake B3 is disposed between the third ring gear R3 and the transmission casing 12. A one-way clutch F1 is disposed in parallel with the third brake B3 between the third ring gear R3 and the transmission casing 12, and the output shaft 24 is connected to the third carrier CA3. The third brake B3 and the one-way clutch F1 cooperate with each other to constitute a third brake device.

The above-described first clutch C1, second clutch C2, third clutch C3, fourth clutch C4, first brake B1, second brake B2 and third brake B3 are hydraulically operated frictional coupling devices commonly used in known automatic transmissions for vehicles. For instance, each of those clutches may be a wet-type multiple-disc clutch having a plurality of friction plates which are superposed on each other and forced against each other by a hydraulic actuator, and each of those brakes may be a band brake having one band or two bands each of which is wound on the outer circumferential surface of a rotary drum and tightened at its one end by a hydraulic actuator. The brakes B1–B3 are selectively engaged to connect the corresponding rotary elements to the transmission casing 12, that is, to selectively bring the corresponding rotary elements to a stationary state.

In the transmission 10 constructed as described above, a selected one of seven forward drive positions and a rear drive position is established by simultaneous engaging actions of a corresponding combination of two or three frictional coupling devices selected from the first, second, third and fourth clutches C1–C4 and the first, second and third brakes B1–B3. The seven forward drive positions are a first-speed, a second-speed, a third-speed, a fourth-speed, a fifth-speed, a sixth-speed and a seventh-speed position, which have respective speed ratios $\gamma$ that change as geometric series. The speed ratio $\gamma$ is equal to $N_{in}/N_{out}$, where $N_{in}$ and $N_{out}$ represent rotating speeds of the input and output shafts 16, 24, respectively.

As shown in FIG. 2, the first-speed position having the highest speed ratio $\gamma_1$ of 4.125, for instance, is established by engaging the first clutch C1 and the third brake B3 to connect the input shaft 16 to the second and third sun gears S2, S3 and to connect the third ring gear R3 and the transmission casing 12. The second-speed position having the speed ratio $\gamma_2$, for instance, about 2.333, which is lower than that of the first-speed position and higher than that of the third-speed position, is established by placing the first clutch C1 and the second brake B2 to connect the input shaft 16 to the second and third sun gears S2, S3 and to connect the first carrier CA1 and the transmission casing 12. The third-speed position having the speed ratio $\gamma_3$, for instance, about 1.654, which is lower than that of the second-speed position and higher than that of the fourth-speed position, is established by placing the first and fourth clutches C1, C4 and the first brake B1 to connect the input shaft 16 to the second and third sun gears S2, S3 and to connect the first sun gear S1 and the transmission casing 12. The fourth-speed position having the speed ratio $\gamma_4$, for instance, about 1.255, which is lower than that of the third-speed position and higher than that of the fifth-speed position, is established by placing the first and second clutches C1, C2 and the first brake B1 to connect the input shaft 16 to the second and third sun gears S2, S3, to connect the input shaft 16 to the first ring gear R1, and to connect the first sun gear S1 and the transmission casing 12. The fifth-speed position having the speed ratio $\gamma_5$, for instance, about 1.000, which is lower than that of the fourth-speed position and higher than that of the sixth-speed position, is established by placing the first, second and fourth clutches C1, C2, C4 to connect the input shaft 16 to the second and third sun gears S2, S3, to connect the input shaft 16 to the first ring gear R1 and to connect the first ring gear R1 and the second carrier CA2. The sixth-speed position having the speed ratio $\gamma_6$, for instance, about 0.791, which is lower than that of the fifth-speed position and higher than that of the seventh-speed position, is established by placing the second and fourth clutches C2, C4 and the first brake B1 to connect the input shaft 16 and the first ring gear R1, to connect the first ring gear R1 and the second carrier CA2 and to connect the first sun gear S1 and the transmission casing 12. The seventh-speed position having the lowest speed ratio $\gamma_7$ of 0.573, for instance, which is lower than that of the sixth-speed position, is established by engaging the second and fourth clutches C2, C4 and the second brake B2 to connect the input shaft 16 and the first ring gear R1, to connect the first ring gear R1 and the second carrier CA2, and to connect the second carrier CA2 and the transmission casing 12. The rear drive position having the ratio $\gamma_R$, for instance, 3.781, which is between those of the first-speed and second-speed positions, is established by engaging the third and fourth clutches C3, C4 and the third brake B3 to connect the input shaft 16 and the first sun gear S1, to connect the first ring gear R1 and the second carrier CA2, and to connect the third ring gear R3 and the transmission casing 12. The gear ratio $\rho_1$ of the first planetary gear set 18, the gear ratio $\rho_2$ of the second planetary gear set 20 and the gear ratio $\rho_3$ of the third planetary gear set 22 are determined to establish the above-indicated speed ratios of the forward drive positions and the rear drive position.

In the transmission 10 described above, a ratio ($\gamma_1/\gamma_2$) of the speed ratio $\gamma_1$ of the first-speed position to the speed ratio $\gamma_2$ of the second-speed position is 1.76, and a ratio ($\gamma_2/\gamma_3$) of the speed ratio $\gamma_2$ of the second-speed position to the speed ratio $\gamma_3$ of the third-speed position is 1.41. A ratio ($\gamma_3/\gamma_4$) of the speed ratio $\gamma_3$ of the third-speed position to the speed ratio $\gamma_4$ of the fourth-speed position is 1.32. A ratio ($\gamma_4/\gamma_5$) of the speed ratio $\gamma_4$ of the fourth-speed position to the speed ratio $\gamma_5$ of the fifth-speed position is 1.25. A ratio ($\gamma_5/\gamma_6$) of the speed ratio $\gamma_5$ of the fifth-speed position to the speed ratio $\gamma_6$ of the sixth-speed position is 1.26. A ratio ($\gamma_6/\gamma_7$) of the speed ratio $\gamma_6$ of the sixth-speed position to the speed ratio $\gamma_7$ of the seventh-speed position is 1.37. Thus, the speed ratios $\gamma_1-\gamma_7$ change as the geometric series. In the transmission 10, a ratio ($\gamma_1/\gamma_7$) of the speed ratio $\gamma_1$ of the first-speed position to the speed ratio $\gamma_7$ of the seventh-speed position is 7.196, which is comparatively high. This ratio ($\gamma_1/\gamma_7$) represents a range of the gear ratio of the transmission 10.

The collinear chart of FIG. 3 indicates, by straight lines, a relationship among the rotating speeds of the rotary elements in each of the operating positions of the transmission 10 in which the rotary elements are connected to each other in respective different manners. The collinear chart of FIG. 3 is a two-dimensional coordinate system in which the gear ratios of the planetary gear sets 18, 20, 22 are taken along the horizontal axis, while the relative rotating speeds of the rotary elements are taken along the vertical axis. A lower one of two horizontal straight lines X1 and X2, that is, the horizontal straight line X1 indicates the rotating speed of "0", while an upper horizontal straight line X2 indicates the rotating speed of "1.0", that is, the rotating speed of the input shaft 16. Five vertical straight lines Y1, Y2, Y3, Y4 and Y5 respectively represent: a first rotary element RE1 consisting of the sun gear S1: a second rotary element RE2 consisting of the first carrier CA1 and the second ring gear R2 that are connected to each other; a third rotary element RE3 consisting of the first ring gear R1, the second carrier CA2 and the third ring gear R3 that are connected to each other; a fourth rotary element RE4 consisting of the third carrier CA3: and a fifth rotary element RE5 consisting of the second and third sun gears S2, S3 that are connected to each other. The distances between the adjacent ones of the vertical straight lines Y1–Y5 are determined by the gear ratios $\rho 1$, $\rho 2$ and $\rho 3$ of the three planetary gear sets 18, 20, 22. In general, the distance between the vertical straight line for each sun gear S1, S2, S3 and the vertical straight line for the corresponding carrier CA1, CA2, CA3 corresponds to "1", while the distance between the vertical straight line for each carrier and the vertical straight line for the corresponding ring gear R1, R2, R3 corresponds to the corresponding gear ratio $\rho$. In FIG. 3, the distance between the vertical straight line Y5 for the sun gear S3 and the vertical straight line Y4 for the corresponding carrier CA3 corresponds to "1", while the distances between the adjacent vertical straight lines Y4, Y3, Y2 and Y1 are determined on the basis of the distance between the lines Y5 and Y4.

Referring to the collinear chart of FIG. 3, there will be described the rotating speeds of the output shaft 24 when the first-speed through seventh-speed positions are established. In the first-speed position, the first clutch C1 is engaged to directly connect the fifth rotary element RE5 to the input shaft 16 so that the rotating speed of the fifth rotary element RE5 is "1", while at the same time the third brake B3 and the one-way clutch F1 are engaged so that the rotating speed of the third rotary element RE3 (whose ring gears R1, R3 and carrier CA2 are connected to each other by engagement of the fourth clutch C4) is "0". In the first-speed position, therefore, the rotating speed of the output shaft 24 (carrier CA3) is represented by a point of intersection (indicated at "$1^{st}$") between the vertical straight line Y4 corresponding to the fourth rotary element RE4 (carrier CA3) and a straight line which connects a point of intersection between the vertical straight line Y3 and the horizontal straight line X1 and a point of intersection between the vertical straight line Y5 and the horizontal straight line X2. In the second-speed position, the first clutch C1 is engaged to directly connect the fifth rotary element RE5 to the input shaft 16 so that the rotating speed of the fifth rotary element RE5 is "1", while at the same time the second brake B2 is engaged so that the rotating speeds of the carrier CA1 and ring gear R2 (corresponding to the second rotary element RE2) are "0". Therefore, the rotating speed of the output shaft 24 (carrier CA3) in the second-speed position, which is one step higher than that in the first-speed position, is represented by a point of intersection (indicated at "$2^{nd}$") between the vertical straight line Y4 corresponding to the fourth rotary element RE4 (carrier CA3) and a straight line which connects a point of intersection between the vertical straight line Y2 and the horizontal straight line X1 and the point of intersection between the vertical straight line Y5 and the horizontal straight line X2. In the third-speed position, the first clutch C1 is engaged to directly connect the fifth rotary element RE5 to the input shaft 16 so that the rotating speed of the fifth rotary element RE5 is "1", while at the same time the first brake B1 is engaged so that the rotating speed of the sun gear S1 (corresponding to the first rotary element RE1) is "0". Therefore, the rotating speed of the output shaft 24 (carrier CA3) in the third-speed position, which is one step higher than that in the second-speed position, is represented by a point of intersection (indicated at "$2^{nd}$") between the vertical straight line Y4 corresponding to the fourth rotary element RE4 (carrier CA3) and a straight line which connects a point of intersection between the vertical straight line Y1 and the horizontal straight line X1 and the point of intersection between the vertical straight line Y5 and the horizontal straight line X2. In the fourth-speed position, the first clutch C1 is engaged to directly connect the fifth rotary element RE5 to the input shaft 16 so that the rotating speed of the fifth rotary element RE5 is "1", and at the same time the first brake B1 is engaged so that the rotating speed of the first rotary element RE1 is zero "0" while the second clutch C2 is engaged so that the rotating speed of the ring gear R1 (corresponding to the third rotary element RE3) is "1". Therefore, the rotating speed of the output shaft 24 in the fourth-speed position, which is one step higher than that in the third-speed position, is represented by a point of intersection (indicated at "$4^{th}$") between the vertical straight line Y4 corresponding to the fourth rotary element RE4 (carrier CA3) and a straight line which connects the point of intersection between the vertical straight line Y5 and the horizontal straight line X2 and a point of intersection between the vertical straight line Y2 and a straight line which connects a point of intersection between the vertical straight line Y1 and the horizontal straight line X1 and a point of intersection between the vertical straight line Y3 and the horizontal straight line X2. In the fifth-speed position, the first clutch C1 is engaged to directly connect the fifth rotary element RE5 to the input shaft 16 so that the rotating speed of the fifth rotary element RE5 is "1", while at the same time second clutch C2 is engaged to directly connect the third rotary element RE3 (whose ring gears RI, R3 and carrier CA2 are connected to each other by engagement of the fourth clutch C4) to the input shaft 16 so that the rotating speed of the third rotary element RE3 is "1". Therefore, the rotating speed of the output shaft 24 in the fifth-speed position, which is one step higher than that in the four-speed position, is represented by a point of intersection (indicated at "$5^{th}$") between the vertical straight line Y4 corresponding to the fourth rotary element RE4 (carrier CA3) and a straight line which connects a point of intersection between the vertical straight line Y3 and the horizontal straight line X2 and the point of intersection between the vertical straight line Y5 and the horizontal straight line X2. In the sixth-speed position, the second clutch C2 is engaged so that the rotating speed of the third rotary element RE3 (whose ring gears R1, R3 and carrier CA2 are connected to each other by engagement of the fourth clutch C4)

is "1", while at the same time the first brake B1 is engaged so that the rotating speed of the first rotary element RE1 (sun gear S1) is "0". Therefore, the rotating speed of the output shaft 24 in the sixth-speed position, which is one step higher than that in the fifth-speed position, is represented by a point of intersection (indicated at "$6^{th}$") between the vertical straight line Y4 corresponding to the fourth rotary element RE4 (carrier CA3) and a straight line which passes the point of intersection between the vertical straight line Y1 and the horizontal straight line X1 and the point of intersection between the vertical straight line Y3 and the horizontal straight line X2. In the seventh-speed position, the second clutch C2 is engaged so that the rotating speed of the third rotary element RE3 (whose ring gears R1, R3 and carrier CA2 are connected to each other by engagement of the fourth clutch C4) is "1", while at the same time the second brake B2 is engaged so that the rotating speed of the second rotary element RE2 (carrier CA1 and ring gear R2) is "0". Therefore, the rotating speed of the output shaft 24 in the seventh-speed position, which is higher than that in the sixth-speed position, is represented by a point of intersection (indicated at "$7^{th}$") between the vertical straight line Y4 corresponding to the fourth rotary element RE4 (carrier CA3) and a straight line which passes the point of intersection between the vertical straight line Y2 and the horizontal straight line X1 and the point of intersection between the vertical straight line Y3 and the horizontal straight line X2. In the rear drive position, the third clutch C3 is engaged so that the rotating speed of the first rotary element (sun gear S1) is "1", while at the same time the second brake B2 is engaged so that the rotating speed of the third rotary element RE3 (whose ring gears R1, R2 and carrier CA2 are connected to each other by engagement of the fourth clutch C4) is "0". Therefore, the rotating speed of the output shaft 24 in the negative direction is represented by a point of intersection (indicated at "Rev") between the vertical straight line Y4 corresponding to the fourth rotary element RE4 (carrier CA3) and a straight line which passes a point of intersection between the vertical straight line Y1 and the horizontal straight line X2 and the point of intersection between the vertical straight line Y3 and the horizontal straight line X1.

In the transmission 10 according to present embodiment arranged to transmit a rotary motion of the input shaft 16 to the output shaft 24 such that the ratio of the speed of the input shaft 16 to the speed of the output shaft 24 is variable in steps, the first planetary gear set 18, the second planetary gear set 20 and the third planetary gear set 22 are disposed coaxially with each other. As described above, the first planetary gear set 18 includes the first sun gear S1, the first planetary gear P1, the first carrier CA1 supporting the first planetary gear P1, and the first ring gear R1 meshing with the first sun gear S1 through the first planetary gear P1, and the second planetary gear set 20 includes the second sun gear S2, the second planetary gear P2, the second carrier CA2 supporting the second planetary gear P2, and the second ring gear R2 meshing with the second sun gear S2 through the second planetary gear P2, while the third planetary gear set 22 includes the third sun gear S3, the third planetary gear P2, the third carrier CA3 supporting the third planetary gear P3, and the third ring gear R3 meshing with the third sun gear S3 through the third planetary gear P3. Further, the first carrier CA1 and the second ring gear R2 are connected to each other, and the first ring gear R1 and the second carrier CA2 are connected to each other, while the second carrier CA2 and the third ring gear R3 are connected to each other. Further, the second and third sun gears S1, S3 are connected to each other, and the input shaft 16 is connected to the first sun gear S1 through the third clutch C3, to the first ring gear R1 through the second clutch C2, and to the second and third sun gears S2, S3 through the first clutch C1. In addition, the first brake B1 is disposed between the first sun gear S1 and the transmission casing 12, and the second brake B2 is disposed between the first carrier CA1 and the transmission casing 12, while the third brake B3 is disposed between the third ring gear R3 and the transmission casing 12. Further, the output shaft 24 is connected to the third carrier CA3. In this arrangement, the combination of the three planetary gear sets 18, 20, 22 enables the planetary gear type multiple-step transmission 10 to be made small-sized, yet having the seven forward drive positions providing a sufficiently wide range of speed ratio, thereby permitting not only high-speed running of the vehicle, but also stable starting of the vehicle on an uphill road.

In the present transmission 10, the first-speed position having the highest speed ratio $\gamma_1$ is established by engaging the first clutch C1 and the third brake B3 to connect the input shaft 16 to the second and third sun gears S2, S3 and to connect the third ring gear R3 and the transmission casing 12. The second-speed position having the speed ratio $\gamma_2$ lower than the speed ratio $\gamma_1$ of the first-speed position is established by engaging the first clutch C1 and the second brake B2 to connect the input shaft 16 to the second and third sun gears S2, S3 and to connect the first carrier CA1 and the transmission casing 12. The third-speed position having the speed ratio $\gamma_3$ lower than the speed ratio $\gamma_2$ of the second-speed position is established by engaging the first clutch C1 and the first brake B1 to connect the input shaft 16 to the second and third sun gears S2, S3 and to connect the first sun gear S1 and the transmission casing 12. The fourth-speed position having the speed ratio $\gamma_4$ lower than the speed ratio $\gamma_3$ of the third-speed position is established by engaging the first and second clutches C1, C2 and the first brake B1 to connect the input shaft 16 to the second and third sun gears S2, S3, to connect the input shaft 16 to the first ring gear R1, and to connect the first sun gear S1 and the transmission casing 12. The fifth-speed position having the speed ratio $\gamma_5$ lower the speed ratio $\gamma_4$ of the fourth-speed position is established by engaging the first, second and fourth clutches C1, C2, C4 to connect the input shaft 16 to the second and third sun gears S2, S3, to connect the input shaft 16 to the first ring gear R1, and to connect the first ring gear R1 and the second carrier CA2. The sixth-speed position having the speed ratio $\gamma_6$ lower the speed ratio $\gamma_5$ of the fifth-speed position is established by engaging the second and fourth clutches C2, C4 and the first brake B1 to connect the input shaft 16 to the first ring gear R1, to connect the first ring gear R1 and the second carrier CA2 and to connect the first sun gear S1 and the transmission casing 12. The seventh-speed position having the speed ratio $\gamma_7$ lower the speed ratio $\gamma_6$ of the sixth-speed position is established by engaging the second and fourth clutches C2, C4 and the second brake B2 to connect the input shaft 16 to the first ring gear R1, to connect the first ring gear R1 and the second carrier CA2 and to connect the second carrier CA2 and the transmission casing 12. The gear ratios $\rho_1$, $\rho_2$ and $\rho_3$ of the first, second and third planetary gear sets 18, 20, 22 are determined such that the first through seventh speed-positions have the respective speed ratios $\lambda_1$–$\lambda_7$ described above. Thus, by selectively engaging the first, second, third and fourth clutches C1–C4 and the first, second and third brakes B1–B3, the speed ratio $\lambda$ of the transmission 10 for forward running of the vehicle is variable as geometric series in seven steps.

In the present embodiment, the rear drive position having the speed ratio $\lambda_1$ lower than the speed ratio $\lambda_1$ of the first-speed position and higher than the speed ratio $\lambda_2$ of the second-speed position is established by engaging the third and fourth clutches C3, C4 and the third brake B3 to connect the input shaft 16 and the first sun gear S1, to connect the first ring gear R1 and the second carrier CA2 and to connect the third ring gear R3 and the transmission casing 12.

The present embodiment is further arranged such that the ratio $\lambda_1/\lambda_2$ of the speed ratio $\lambda_1$ of the first-speed position to the speed ratio $\lambda_2$ of the second-speed position is equal to 1.76, and the ratio $\lambda_2/\lambda_3$ of the speed ratio $\lambda_2$ of the second-speed position to the speed ratio $\lambda_3$ of the third-speed position is equal to 1.41, while the ratio $\lambda_3/\lambda_4$ of the speed ratio $\lambda_3$ of the third-speed position to the speed ratio $\lambda_4$ of the fourth-speed position is equal to 1.32. Further, the ratio $\lambda_4/\lambda_5$ of the speed ratio $\lambda_4$ of the fourth-speed position to the speed ratio $\lambda_5$ of the fifth-speed position is equal to 1.25, and the ratio $\lambda_5/\lambda_6$ of the speed ratio $\lambda_5$ of the fifth-speed position to the speed ratio $\lambda_6$ of the sixth-speed position is equal to 1.26, while the ratio $\lambda_6/\lambda_7$ of the speed ratio $\lambda_6$ of the sixth-speed position to the speed ratio $\lambda_7$ of the seventh-speed position is equal to 1.37. Thus, the speed ratio $\lambda$ of the transmission 10 is variable as geometric series, assuring excellent vehicle accelerating characteristics.

The present embodiment is further arranged such that the ratio $\gamma_1/\gamma_7$ of the speed ratio $\gamma_1$ of the first-speed position to the speed ratio $\gamma_7$ of the seventh-speed position is as high as 7.196. Thus, the present planetary gear type multiple-step transmission 10 has a comparatively wide range of gear ratio, permitting not only high-speed running of the vehicle, but also stable starting of the vehicle on an uphill road In the present embodiment, the first, second and third planetary gear sets 18, 20, 22 are disposed in this order of description between the input shaft 16 and the output shaft 24, such that an output of the engine is applied to the input shaft 16 of the transmission 10 through the torque converter 14, so that the automatic transmission 10 has a compact arrangement.

In the present embodiment wherein the one-way clutch F1 is disposed in parallel with the third brake B3 disposed between the third ring gear R3 and the transmission casing 12, engine brake application in the first-speed position is permitted by engaging the third brake B3, and inhibited by engaging the one-way clutch F1.

There will be described other embodiments of this invention. The same reference signs as used in the first embodiment of FIGS. 1–3 will be used in the following embodiments, to identify the functionally corresponding elements.

Referring to the schematic view of FIG. 4, there is illustrated a transmission 30 in which the first, second and third planetary gear sets 18, 20, 22 have respective gear ratios $\rho_1$, $\rho_2$ and $\rho_3$ of about 0.420, 0.334 and 0.360, for example. In this transmission 30, the first and second carriers CA1, CA2 and the third ring gear R3 are integrally connected to each other, and the first and second ring gears R1, R2 are integrally connected to each other, while the second and third sun gears S2, S3 are integrally connected to each other. The input shaft 16 (input rotary member) is connected to the second and third sun gears S2, S3 through the first clutch C2, to the first carrier CA1 through the second clutch C2, and to the first sun gear S1 through the third clutch C3. The fourth clutch C4 is disposed between the first and second carriers CA1, CA2, so that these first and second carriers CA1, CA2 are connected to each other through the fourth clutch C4. The first brake B1 is disposed between the first sun gear S1 and the transmission casing 12 (non-rotary member), and the second brake B2 is disposed between the transmission casing 12 and an assembly of the first and second ring gears R1, R2, while the third brake B3 is disposed between the transmission casing 12 and an assembly of the first and second carrier CA2 and third ring gear R3. The third carrier CA3 is connected to the output shaft 24 (output rotary member).

The above-described first clutch C1, second clutch C2, third clutch C3, fourth clutch C4, first brake B1, second brake B2 and third brake B3 are hydraulically operated frictional coupling devices commonly used in known automatic transmissions for vehicles. For instance, each of those clutches may be a wet-type multiple-disc clutch having a plurality of friction plates which are superposed on each other and forced against each other by a hydraulic actuator, and each of those brakes may be a band brake having one band or two bands each of which is wound on the outer circumferential surface of a rotary drum and tightened at its one end by a hydraulic actuator. The third brake B3 and the one-way clutch F1 disposed in parallel with the third brake B3 cooperate to function as a third brake device, and only one of the brake B3 and the one-way clutch F1 may be provided.

In the transmission 30 constructed as described above, a selected one of the seven forward drive positions and the rear drive position is established by simultaneous engaging actions of a corresponding combination of two or three frictional coupling devices selected from the first, second, third and fourth clutches C1–C4 and the first, second and third brakes B1–B3. The seven forward drive positions have respective speed ratios $\gamma$ ($=N_{in}/N_{out}$) that change as geometric series.

As shown in FIG. 5, the first-speed position having the highest speed ratio $\gamma_1$ of 3.778, for instance, is established by engaging the first clutch C1 and the third brake B3 to connect the input shaft 16 to the second and third sun gears S2, S3 and to connect the third ring gear R3 and the transmission casing 12. The second-speed position having the speed ratio $\gamma_2$, for instance, about 2.229, which is lower than that of the first-speed position, is established by placing the first clutch C1 and the second brake B2 to connect the input shaft 16 to the second and third sun gears S2, S3, and to connect the first and second ring gears R1, R2 to the transmission casing 12. The third-speed position having the speed ratio $\gamma_3$, for instance, about 1.694, which is lower than that of the second-speed position, is established by placing the first and fourth clutches C1, C4 and the first brake B1 to connect the input shaft 16 to the second and third sun gears S2, S3, to connect the first and second carriers CA1, CA2, and to connect the first sun gear S1 and the transmission casing 12. The fourth-speed position having the speed ratio $\gamma_4$, for instance, about 1.301, which is lower than that of the third-speed position, is established by placing the first and second clutches C1, C2 and the first brake B1 to connect the input shaft 16 to the second and third sun gears S2, S3, to connect the input shaft 16 to the first carrier CA1, and to connect the first sun gear S1 and the transmission casing 12. The fifth-speed position having the speed ratio $\gamma_5$, for instance, about 1.000, which is lower than that of the fourth-speed position, is established by placing the first, second and fourth clutches C1, C2, C4 to connect the input shaft 16 to the second and third sun gears S2, S3, to connect the input shaft 16 to the first carrier CA1 and to connect the first and second carriers CA1, CA2. The sixth-speed position having the speed ratio $\gamma_6$, for instance, about 0.750, which is lower than that of the fifth-speed position, is established by placing the second and fourth clutches C2, C4 and the first brake B1 to connect the input shaft 16 and the first carrier CA1, to connect the first and second carriers CA1, CA2, and to connect the first sun gear S1 and the transmission casing 12. The seventh-speed position having the lowest speed ratio $\gamma_7$ of 0.558, for instance, which is lower than that of the sixth-speed position, is established by engaging the second and fourth clutches C2, C4 and the second brake B2 to connect the input shaft 16 and the first carrier CA1, to connect the first and second carriers CA1, CA2, and to connect the first and second ring gears R1, R2 to the transmission casing 12. The rear drive position having the ratio $\gamma_R$, for instance, 3.003, which is between those of the first-speed and second-speed positions, is established by engaging the third and fourth clutches C3, C4 and the third brake B3 to connect the input shaft 16 and the first sun gear S1, to connect the first and second carriers CA1, CA2, and to connect the third ring gear R3 and the transmission casing 12. The gear ratio $\rho_1$ of the first planetary gear set 18, the gear ratio $\rho_2$ of the second planetary gear set 20 and the gear ratio $\rho_3$ of the third planetary gear set 22 are determined to establish the above-indicated speed ratios of the forward drive positions and the rear drive position.

In the transmission 30 described above, a ratio $(\gamma_1/\gamma_2)$ of the speed ratio $\gamma_1$ of the first-speed position to the speed ratio $\gamma_2$ of the second-speed position is 1.695, and a ratio $(\gamma_2/\gamma_3)$ of the speed ratio $\gamma_2$ of the second-speed position to the speed ratio $\gamma_3$ of the third-speed position is 1.316. A ratio $(\gamma_3/\gamma_4)$ of the speed ratio $\gamma_3$ of the third-speed position to the speed ratio $\gamma_4$ of the fourth-speed position is 1.302. A ratio $(\gamma_4/\gamma_5)$ of the speed ratio $\gamma_4$ of the fourth-speed position to the speed ratio $\gamma_5$ of the fifth-speed position is 1.301. A ratio $(\gamma_5/\gamma_6)$ of the speed ratio $\gamma_5$ of the fifth-speed position to the speed ratio $\gamma_6$ of the sixth-speed position is 1.333. A ratio $(\gamma_6/\gamma_7)$ of the speed ratio $\gamma_6$ of the sixth-speed position to the speed ratio $\gamma_7$ of the seventh-speed position is 1.345. Thus, the speed ratios $\gamma_1$–$\gamma_7$ change as the geometric series. In the transmission 30, a ratio $(\gamma_1/\gamma_7)$ of the speed ratio $\gamma_1$ of the first-speed position to the speed ratio $\gamma_7$ of the seventh-speed position is 6.773, which is comparatively high. This ratio $(\gamma_1/\gamma_7)$ represents a range of the gear ratio of the transmission 30.

The collinear chart of FIG. 6 is identical with that of FIG. 3, except in that the second rotary element RE2 consists of the first and second ring gears R, R2, while the third rotary element RE3 consists of the first and second carriers CA1, CA2 and the third ring gear R3. The foregoing descriptions by reference to FIG. 3 substantially apply to the present second embodiment of FIGS. 4–6.

In this second embodiment, the combination of the three planetary gear sets 18, 20, 22 enables the planetary gear type multiple-step transmission 10 to be made small-sized, yet having the seven forward drive positions providing a sufficiently wide range of speed ratio, thereby permitting not only high-speed running of the vehicle, but also stable starting of the vehicle on an uphill road.

In the present transmission 30, the first-speed position having the highest speed ratio $\gamma_1$ is established by engaging the first clutch C1 and the third brake B3, and the second-speed position having the speed ratio $\gamma_2$ lower than the speed ratio $\gamma_1$ of the first-speed position is established by engaging the first clutch C1 and the second brake B2, , while the third-speed position having the speed ratio $\gamma_3$ lower than the speed ratio $\gamma_2$ of the second-speed position is established by engaging the first and fourth clutches C1, C4 and the first brake B1. Further, the fourth-speed position having the speed ratio $\gamma_4$ lower than the speed ratio $\gamma_3$ of the third-speed position is established by engaging the first and second clutches C1, C2 and the first brake B1, and the fifth-speed position having the speed ratio $\gamma_5$ lower the speed ratio $\gamma_4$ of the fourth-speed position is established by engaging the first, second and fourth clutches C1, C2, C4, while the sixth-speed position having the speed ratio $\gamma_6$ lower the speed ratio $\gamma_5$ of the fifth-speed position is established by engaging the second and fourth clutches C2, C4 and the first brake B1. Further, the seventh-speed position having the speed ratio $\gamma_7$ lower the speed ratio $\gamma_6$ of the sixth-speed position is established by engaging the second and fourth clutches C2, C4 and the second brake B2. The gear ratios $\rho_1$, $\rho_2$ and $\rho_3$ of the first, second and third planetary gear sets 18, 20, 22 are determined such that the first through seventh speed-positions have the respective speed ratios $\lambda_1$–$\lambda_7$ described above. Thus, by selectively engaging the first, second, third and fourth clutches C1–C4 and the first, second and third brakes B1–B3, the speed ratio $\lambda$ of the transmission 30 for forward running of the vehicle is variable substantially as geometric series in seven steps.

In the present second embodiment, the rear drive position having the speed ratio $\lambda_1$ lower than the speed ratio $\lambda_1$ of the first-speed position and higher than the speed ratio $\lambda_2$ of the first-speed position is established by engaging the third and fourth clutches C3, C4 and the third brake B3.

The present second embodiment is further arranged such that the ratio $\lambda_1/\lambda_2$ of the speed ratio $\lambda_1$ of the first-speed position to the speed ratio $\lambda_2$ of the second-speed position is equal to 1.695, and the ratio $\lambda_2/\lambda_3$ of the speed ratio $\lambda_2$ of the second-speed position to the speed ratio $\lambda_3$ of the third-speed position is equal to 1.316, while the ratio $\lambda_3/\lambda_4$ of the speed ratio $\lambda_3$ of the third-speed position to the speed ratio $\lambda_4$ of the fourth-speed position is equal to 1.302. Further, the ratio $\lambda_4/\lambda_5$ of the speed ratio $\lambda_5$ of the fourth-speed position to the speed ratio $\lambda_5$ of the fifth-speed position is equal to 1.301, and the ratio $\lambda_5/\lambda_4$ of the speed ratio $\lambda_5$ of the fifth-speed position to the speed ratio $\lambda_6$ of the sixth-speed position is equal to 1.33, while the ratio $\lambda_6/\lambda_5$ of the speed ratio $\lambda_6$ of the sixth-speed position to the speed ratio $\lambda_7$ of the seventh-speed position is equal to 1.345. Thus, the speed ratio $\lambda$ of the transmission 30 is variable as geometric series, assuring excellent vehicle accelerating characteristics.

The present second embodiment is further arranged such that the ratio $\gamma_1/\gamma_7$ of the speed ratio $\gamma_1$ of the first-speed position to the speed ratio $\gamma_7$ of the seventh-speed position is as high as 6.773. Thus, the present planetary gear type multiple-step transmission 30 has a comparatively wide range of gear ratio, permitting not only high-speed running of the vehicle, but also stable starting of the vehicle on an uphill road In the present embodiment, the first, second and third clutches C1, C2, C3 are disposed in a front portion of the transmission 30, while the first, second and third brakes B1, B2, B3 are disposed on the transmission casing 12, that is, in a radially outer portion of the transmission 30. This arrangement facilitates connection of fluid passages to the clutches and brakes C1–C3 and B1–B3.

In the present second embodiment, the first, second and third planetary gear sets 18, 20, 22 are disposed in this order of description between the input shaft 16 and the output shaft 24, such that an output of the engine is applied to the input shaft 16 of the transmission 30 through the torque converter 14, so that the automatic transmission 30 has a compact arrangement.

In the present second embodiment wherein the one-way clutch F1 is disposed in parallel with the third brake B3 disposed between the third ring gear R3 and the transmission casing 12, engine brake application in the first-speed position is permitted by engaging the third brake B3, and inhibited by engaging the one-way clutch F1.

Referring next to the views of FIGS. 7–9 corresponding to those of FIGS. 1–3, there will be described a transmission 40 constructed according to a third embodiment of this invention, which is identical with the transmission 30 of the second embodiment of FIGS. 4–6, except in that the third brake B3 and the one-way clutch F1 disposed in parallel with each other is interposed between the first carrier CA1 and the transmission casing 12.

In this transmission 40, the first-speed position having the highest speed ratio $\gamma_1$ of 3.778, for instance, is established by engaging the first and fourth clutches C1, C4 and the third brake B3 to connect the input shaft 16 to the second and third sun gears S2, S3, to connect the first and second carriers CA1, CA2, and to connect the first carrier CA1 and the transmission casing 12. The second-speed position having the speed ratio $\gamma_2$, for instance, about 2.229, which is lower than that of the first-speed position, is established by placing the first clutch C1 and the second brake B2 to connect the input shaft 16 to the second and third sun gears S2, S3, and to connect the first and second ring gears R1, R2 to the transmission casing 12. The third-speed position having the speed ratio $\gamma_3$, for instance, about 1.694, which is lower than that of the second-speed position, is established by placing the first and fourth clutches C1, C4 and the first brake B1 to connect the input shaft 16 to the second and third sun gears S2, S3, to connect the first and second carriers CA1, CA2, and to connect the first sun gear S1 and the transmission casing 12. The fourth-speed position having the speed ratio $\gamma_4$, for instance, about 1.301, which is lower than that of the third-speed position, is established by placing the first and second clutches C1, C2 and the first brake B1 to connect the input shaft 16 to the second and third sun gears S2, S3, to connect the input shaft 16 to the first carrier CA1, and to connect the first sun gear S1 and the transmission casing 12. The fifth-speed position having the speed ratio $\gamma_5$, for instance, about 1.000, which is lower than that of the fourth-speed position, is established by placing the first, second and fourth clutches C1, C2, C4 to connect the input shaft 16 to the second and third sun gears S2, S3, to connect the input shaft 16 to the first carrier CA1, and to connect the first and second carriers CA1, CA2. The sixth-speed position having the speed ratio $\gamma_6$, for instance, about 0.750, which is lower than that of the fifth-speed position, is established by placing the second and fourth clutches C2, C4 and the first brake B1 to connect the input shaft 16 and the first carrier CA1, to connect the first and second carriers CA1, CA2, and to connect the first sun gear S1 and the transmission casing 12. The seventh-speed position having the lowest speed ratio $\gamma_7$ of 0.558, for instance, which is lower than that of the sixth-speed position, is established by engaging the second and fourth clutches C2, C4 and the second brake B2 to connect the input shaft 16 and the first carrier CA1, to connect the first and second carriers CA1, CA2, and to connect the first and second ring gears R1, R2 to the transmission casing 12. The rear drive position having the ratio $\gamma_R$, for instance, 3.003, which is between those of the first-speed and second-speed positions, is established by engaging the third and fourth clutches C3, C4 and the third brake B3 to connect the input shaft 16 and the first sun gear S1, to connect the first and second carriers CA1, CA2, and to connect the third ring gear R3 and the transmission casing 12. The gear ratio $\rho_1$ of the first planetary gear set 18, the gear ratio $\rho_2$ of the second planetary gear set 20 and the gear ratio $\rho_3$ of the third planetary gear set 22 are determined to establish the above-indicated speed ratios of the forward drive positions and the rear drive position.

In the transmission 40 described above, a ratio $(\gamma_1/\gamma_2)$ of the speed ratio $\gamma_1$ of the first-speed position to the speed ratio $\gamma_2$ of the second-speed position is 1.695, and a ratio $(\gamma_2/\gamma_3)$ of the speed ratio $\gamma_2$ of the second-speed position to the speed ratio $\gamma_3$ of the third-speed position is 1.316. A ratio $(\gamma_3/\gamma_4)$ of the speed ratio $\gamma_3$ of the third-speed position to the speed ratio $\gamma_4$ of the fourth-speed position is 1.302. A ratio $(\gamma_4/\gamma_5)$ of the speed ratio $\gamma_4$ of the fourth-speed position to the speed ratio $\gamma_5$ of the fifth-speed position is 1.301. A ratio $(\gamma_5/\gamma_6)$ of the speed ratio $\gamma_5$ of the fifth-speed position to the speed ratio $\gamma_6$ of the sixth-speed position is 1.333. A ratio $(\gamma_6/\gamma_7)$, of the speed ratio $\gamma_6$ of the sixth-speed position to the speed ratio $\gamma_7$ of the seventh-speed position is 1.345. Thus, the speed ratios $\gamma_{1-\gamma 7}$ change as the geometric series. In the transmission 40, a ratio $(\gamma_1/\gamma_7)$ of the speed ratio $\gamma_1$ of the first-speed position to the speed ratio $\gamma_7$ of the seventh-speed position is 6.773, which is comparatively high. This ratio $(\gamma_1/\gamma_7)$ represents a range of the gear ratio of the transmission 40.

The collinear chart of FIG. 9 is identical with that of FIG. 3, except in that the second rotary element RE2 consists of the first and second ring gears R1, R2, while the third rotary element RE3 consists of the first and second carriers CA1, CA2 and the third ring gear R3. The foregoing descriptions by reference to FIG. 3 substantially apply to the present third embodiment of FIGS. 7–9.

Referring next to the views of FIGS. 10–12 corresponding to those of FIGS. 1–3, there will be described a transmission 50 constructed according to a fourth embodiment of this invention, which is identical with the transmission 30 of the second embodiment of FIGS. 4–6, except in that the input shaft 16 is connected to the second carrier CA2 through the second clutch C2 in the transmission 50, while the fourth clutch C4 connecting the first and second carriers CA1, CA2 is disposed between the first planetary gear set 18 and the torque converter 14 in the transmission 30. In the present fourth embodiment, the fourth clutch C4 is disposed in a front portion of the transmission 50, and fluid passages can be easily connected to this fourth clutch C4.

Referring next to the views of FIGS. 13–15 corresponding to those of FIGS. 1–3, there will be described a transmission 60 constructed according to a fifth embodiment of this invention, which is identical with the transmission 30 of the second embodiment of FIGS. 4–6, except in that the third clutch C3 is not provided in the transmission 60, while third clutch C3 is disposed between the input shaft 16 and the first sun gear S1 and is engaged to establish the rear drive position, in the transmission 30. In the present transmission 60, the rear drive position is established by engaging the second clutch C2 and the first and third brakes B1, B3.

In this transmission 60, the first-speed position having the highest speed ratio $\gamma_1$ of 3.778, for instance, is established by engaging the first clutch C1 and the third brake B3 to connect the input shaft 16 to the second and third sun gears S2, S3, and to connect the third ring bear R3 and the transmission casing 12. The second-speed position having the speed ratio $\gamma_2$, for instance, about 2.205, which is lower than that of the first-speed position, is established by placing the first clutch C1 and the second brake B2 to connect the input shaft 16 to the second and third sun gears S2, S3, and to connect the first and second ring gears R1, R2 to the transmission casing 12. The third-speed position having the speed ratio $\gamma_3$, for instance, about 1.694, which is lower than that of the second-speed position, is established by placing the first and fourth clutches C1, C4 and the first brake B1 to connect the input shaft 16 to the second and third sun gears S2, S3, to connect the first and second carriers CA1, CA2, and to connect the first sun gear S1 and the transmission casing 12. The fourth-speed position having the speed ratio $\gamma_4$, for instance, about 1.312, which is lower than that of the third-speed position, is established by placing the first and second clutches C1, C2 and the first brake B1 to connect the input shaft 16 to the second and third sun gears S2, S3, to connect the input shaft 16 to the first carrier CA1, and to connect the first sun gear S1 and the transmission casing 12. The fifth-speed position having the speed ratio $\gamma_5$, for instance, about 1.000, which is lower than that of the fourth-speed position, is established by placing the first, second and fourth clutches C1, C2, C4 to connect the input shaft 16 to the second and third sun gears S2, S3, to connect the input shaft 16 to the first carrier CA1, and to connect the first and second carriers CA1, CA2. The sixth-speed position having the speed ratio $\gamma_6$, for instance, about 0.750, which is lower than that of the fifth-speed position, is established by placing the second and fourth clutches C2, C4 and the first brake B1 to connect the input shaft 16 and the first carrier CA1, to connect the first and second carriers CA1, CA2, and to connect the first sun gear S1 and the transmission casing 12. The seventh-speed position having the lowest speed ratio $\gamma_7$ of 0.566, for instance, which is lower than that of the sixth-speed position, is established by engaging the second and fourth clutches C2, C4 and the second brake B2 to connect the input shaft 16 and the first carrier CA1, to connect the first and second carriers CA1, CA2, and to connect the first and second ring gears R1, R2 to the transmission casing 12. The rear drive position having the ratio $\gamma_R$, for instance, 2.311, which is between those of the first-speed and second-speed positions, is established by engaging the second clutch C2 and the first and third brakes B1, B3 to connect the input shaft 16 and the first sun gear S1, to connect the first carrier CA1 and the transmission casing 12, and to connect the third ring gear R3 and the transmission casing 12. The gear ratio $\rho_1$ of the first planetary gear set 18, the gear ratio $\rho_2$ of the second planetary gear set 20 and the gear ratio $\rho_3$ of the third planetary gear set 22 are determined to establish the above-indicated speed ratios of the forward drive positions and the rear drive position.

The collinear chart of FIG. 15 is identical with that of FIG. 3, except in that the second rotary element RE2 consists of the first and second ring gears R1, R2, while the third rotary element RE3 consists of the first and second carriers CA1, CA2 and the third ring gear R3. The foregoing descriptions by reference to FIG. 3 substantially apply to the present third embodiment of FIGS. 7–9.

In the transmission 60 described above, a ratio ($\gamma_1/\gamma_2$) of the speed ratio $\gamma_1$ of the first-speed position to the speed ratio $\gamma_2$ of the second-speed position is 1.713, and a ratio ($\gamma_2/\gamma_3$) of the speed ratio $\gamma_2$ of the second-speed position to the speed ratio $\gamma_3$ of the third-speed position is 1.301. A ratio ($\gamma_3/\gamma_4$) of the speed ratio $\gamma_3$ of the third-speed position to the speed ratio $\gamma_4$ of the fourth-speed position is 1.291. A ratio ($\gamma_4/\gamma_5$) of the speed ratio $\gamma_4$ of the fourth-speed position to the speed ratio $\gamma_5$ of the fifth-speed position is 1.312. A ratio ($\gamma_5/\gamma_6$) of the speed ratio $\gamma_5$ of the fifth-speed position to the speed ratio $\gamma_6$ of the sixth-speed position is 1.333. A ratio ($\gamma_6/\gamma_7$) of the speed ratio $\gamma_6$ of the sixth-speed position to the speed ratio $\gamma_7$ of the seventh-speed position is 1.325. Thus, the speed ratios $\gamma_1$–$\gamma_7$ change as the geometric series. In the transmission 60, a ratio ($\gamma_1/\gamma_7$) of the speed ratio $\gamma_1$ of the first-speed position to the speed ratio $\gamma_7$ of the seventh-speed position is 6.675, which is comparatively high. This ratio ($\gamma_1/\gamma_7$) represents a range of the gear ratio of the transmission 60.

While the speed ratio $\gamma_R$ of the rear drive position in the transmission 60 of the present fifth embodiment is relatively low, the transmission 60 not including the third clutch C3 is smaller in size and weight and simpler in the hydraulic arrangement than the transmissions of the preceding embodiments, as well as provides substantially the same advantages as described above with respect to the first embodiment.

Referring next to the views of FIGS. 16–18 corresponding to those of FIGS. 1–3, there will be described a transmission 70 constructed according to a sixth embodiment of this invention, which is identical with the transmission 30 of the second embodiment of FIGS. 4–6, except in that the second clutch C2 connects the input shaft 16 and the second carrier CA2, while the third clutch C3 connects the input shaft 16 and the first carrier CA1, and in that the combinations of the frictional coupling devices used to establish the fourth-speed, fifth-speed and seventh-speed positions and the rear drive positions are different from those in the second embodiment.

In this transmission 70, the first-speed position having the highest speed ratio $\gamma_1$ of 3.778, for instance, is established by engaging the first clutch C1 and the third brake B3 to connect the input shaft 16 to the second and third sun gears S2, S3, and to connect the second carrier CA2 and the third ring gear R3 to the transmission casing 12. The second-speed position having the speed ratio $\gamma_2$, for instance, about 2.205, which is lower than that of the first-speed position, is established by placing the first clutch C1 and the second brake B2 to connect the input shaft 16 to the second and third sun gears S2, S3, and to connect the first and second ring gears R1, R2 to the transmission casing 12. The third-speed position having the speed ratio $\gamma_3$, for instance, about 1.694, which is lower than that of the second-speed position, is established by placing the first and fourth clutches C1, C4 and the first brake B1 to connect the input shaft 16 to the second and third sun gears S2, S3, to connect the first and second carriers CA1, CA2, and to connect the first sun gear S1 and the transmission casing 12. The fourth-speed position having the speed ratio $\gamma_4$, for instance, about 1.312, which is lower than that of the third-speed position, is established by placing the first and third clutches C1, C3 and the first brake B1 to connect the input shaft 16 to the second and third sun gears S2, S3, to connect the input shaft 16 to the first carrier CA1, and to connect the first sun gear S1 and the transmission casing 12. The fifth-speed position having the speed ratio $\gamma_5$, for instance, about 1.000, which is lower than that of the fourth-speed position, is established by placing the first and second clutches C1, C2 to connect the input shaft 16 to the second and third sun gears S2, S3, and to connect the input shaft 16 and the second carrier CA2. The sixth-speed position having the speed ratio $\gamma_6$, for instance, about 0.750, which is lower than that of the fifth-speed position, is established by placing the second and fourth clutches C2, C4 and the first brake B1 to connect the input shaft 16 and the first carrier CA1, to connect the first and second carriers CA1, CA2 to the third ring gear R3, and to connect the first sun gear S1 and the transmission casing 12. The seventh-speed position having the lowest speed ratio $\gamma_7$ of 0.566, for instance, which is lower than that of the sixth-speed position, is established by engaging the third clutch C3 and the second brake B2 to connect the input shaft 16 and the first carrier CA1, and to connect the first and second ring gears R1, R2 to the transmission casing 12. The rear drive position having the ratio $\gamma_R$, for instance, 2.311, which is between those of the first-speed and second-speed positions, is established by engaging the third clutch C3 and the first and third brakes B1, B3 to connect the input shaft 16 and the first carrier CA1, to connect the first sun gear S1 and the transmission casing 12, and to connect the second carrier CA2 and the third ring gear R3 to the transmission casing 12. The present transmission 70 provides substantially the same advantages as described above with the preceding embodiments, and a further advantage that the first planetary gear set 18 is held in a free state and its planetary gear P1 is therefore prevented from being rotated at an excessively high relative speed, when the transmission 70 is placed in the seventh-speed position in which the fourth clutch C4 is in the released state.

In the transmission 70 described above, a ratio ($\gamma_1/\gamma_2$) of the speed ratio $\gamma_1$ of the first-speed position to the speed ratio $\gamma_2$ of the second-speed position is 1.713, and a ratio ($\gamma_2/\gamma_3$) of the speed ratio $\gamma_2$ of the second-speed position to the speed ratio $\gamma_3$ of the third-speed position is 1.301. A ratio ($\gamma_3/\gamma_4$) of the speed ratio $\gamma_3$ of the third-speed position to the speed ratio $\gamma_4$ of the fourth-speed position is 1.312. A ratio ($\gamma_4/\gamma_5$) of the speed ratio $\gamma_4$ of the fourth-speed position to the speed ratio $\gamma_5$ of the fifth-speed position is 1.333. A ratio ($\gamma_5/\gamma_6$) of the speed ratio $\gamma_5$ of the fifth-speed position to the speed ratio $\gamma_6$ of the sixth-speed position is 1.324. A ratio ($\gamma_6/\gamma_7$) of the speed ratio $\gamma_6$ of the sixth-speed position to the speed ratio $\gamma_7$ of the seventh-speed position is 1.324. Thus, the speed ratios $\gamma_1$–$\gamma_7$ change as the geometric series. In the transmission 70, a ratio ($\gamma_1/\gamma_7$) of the speed ratio $\gamma_1$, of the first-speed position to the speed ratio $\gamma_7$ of the seventh-speed position is 6.671, which is comparatively high. This ratio ($\gamma_1/\gamma_7$) represents a range of the gear ratio of the transmission 70.

The collinear chart of FIG. 18 is identical with that of FIG. 3, except in that the second rotary element RE2 consists of the first and second ring gears R1, R2, while the third rotary element RE3 consists of the first and second carriers CA1, CA2 and the third ring gear R3. The foregoing descriptions by reference to FIG. 3 substantially apply to the present third embodiment of FIGS. 7–9.

Referring next to the views of FIGS. 19–21 corresponding to those of FIGS. 1–3, there will be described a transmission 80 constructed according to a seventh embodiment of this invention, which is identical with the transmission 60 of the fifth embodiment of FIGS. 13–15 in that the third clutch C3 is not provided, but is different from the transmission 60 in the connection of the elements of the first planetary gear set 18. Described in more detail, the second clutch C2 connects the input shaft 16 and the first sun gear S1, and the fourth clutch C4 connects the first sun gear S1 and the second carrier CA2, while the first brake B1 connects the first carrier CA1 and the transmission casing 12. In the present transmission 80, the seven forward drive positions and the rear drive position are established by engaging the same combinations of the frictional coupling devices as in the transmission 60 of FIGS. 13–15. The fourth-speed position is established by engaging the first and second clutches C1, C2 and the first brake B1, and the fifth-speed position is established by engaging the first, second and fourth clutches C1, C2, C4, while the seventh-speed position is established by engaging the second and fourth clutches C2, C4 and the second brake B2. The present transmission 80 have substantially the same advantages regarding the speed ratios, gear ratio range and operation as the transmission 60 of the preceding embodiment of FIGS. 13–15, in particular, reduced size and weight and simplified arrangement of the hydraulic circuit, owing to the elimination of the third clutch C3. The collinear chart of FIG. 21 is identical with that of FIG. 3, except in that the first rotary element RE 1 consists of the first carrier CA1, and the second rotary element RE2 consists of the first and second ring gears R1, R2, while the third rotary element RE3 consists of the first sun gear S1, second carrier CA2 and third ring gear R3. The foregoing descriptions by reference to FIG. 3 substantially apply to the present seventh embodiment of FIGS. 19–21.

Referring next to the views of FIGS. 22–24 corresponding to those of FIGS. 1–3, there will be described a transmission 90 constructed according to an eighth embodiment of this invention, which is identical with the transmission 70 of the sixth embodiment of FIGS. 16–18, except in that the third clutch C3 connects the input shaft 16 and the first sun gear S1, and the first brake B1 connects the first carrier CA1 and the transmission casing 12. The present transmission 90 have substantially the same advantages regarding the speed ratios, gear ratio range and operation as the transmission 70 of FIGS. 16–18. The transmission 90 is further advantageous in that the first planetary gear set 18 is held in a free state and its planetary gear P1 is therefore prevented from being rotated at an excessively high relative speed, when the transmission 90 is placed in the seventh-speed position in which the fourth clutch C4 is in the released state. The collinear chart of FIG. 24 is also identical with that of FIG. 3, except in that the first rotary element RE1 consists of the first carrier CA1, and the second rotary element RE2 consists of the first and second ring gears R1, R2, while the third rotary element RE3 consists of the first sun gear S1, second carrier CA2 and third ring gear R3. The foregoing descriptions by reference to FIG. 3 substantially apply to the present eighth embodiment of FIGS. 22–24.

Referring next to the views of FIGS. 25–27 corresponding to those of FIGS. 1–3, there will be described a transmission 100 constructed according to a ninth embodiment of this invention, which is identical with the transmission 40 of the third embodiment of FIGS. 7–9, except in that the fourth clutch C4 is disposed between the torque converter 14 and the first planetary gear set 18 in the present transmission 100, while the fourth clutch C4 is disposed between the first and second planetary gear sets 18, 20 in the transmission 40. The present transmission 100 have substantially the same advantages regarding the speed ratios, gear ratio range and operation as the transmission 40 of FIGS. 7–9. The transmission 100 is further advantageous in that the first planetary gear set 18 is held in a free state and its planetary gear P1 is therefore prevented from being rotated at an excessively high relative speed, when the transmission 100 is placed in the seventh-speed position in which the fourth clutch C4 is in the released state. The collinear chart of FIG. 27 is also identical with that of FIG. 3, except in that the second rotary element RE2 consists of the first and second ring gears R1, R2, while the third rotary element RE3 consists of the first and second carriers CA1, CA2 and third ring gear R3. The foregoing descriptions by reference to FIG. 3 substantially apply to the present ninth embodiment of FIGS. 25–27.

Referring next to the views of FIGS. 28–30 corresponding to those of FIGS. 1–3, there will be described a transmission 110 constructed according to a tenth embodiment of this invention, which is identical with the transmission 30 of the second embodiment of FIGS. 4–6, except in that the fourth clutch C4 is disposed between the torque converter 14 and the first planetary gear set 18 in the present transmission 110, while the fourth clutch C4 is disposed between the first and second planetary gear sets 18, 20 in the transmission 30. The present transmission 110 have substantially the same advantages regarding the speed ratios, gear ratio range and operation as the transmission 30 of FIGS. 4–6. The transmission 1110 is further advantageous in that the first planetary gear set 18 is held in a free state and its planetary gear P1 is therefore prevented from being rotated at an excessively high relative speed, when the transmission 110 is placed in the seventh-speed position in which the fourth clutch C4 is in the released state. The collinear chart of FIG. 30 is also identical with that of FIG. 3, except in that the second rotary element RE2 consists of the first and second ring gears R1, R2, while the third rotary element RE3 consists of the first and second carriers CA1, CA2 and third ring gear R3. The foregoing descriptions by reference to FIG. 3 substantially apply to the present tenth embodiment of FIGS. 28–30.

Referring next to the views of FIGS. 31–33 corresponding to those of FIGS. 1–3, there will be described a transmission 120 constructed according to an eleventh embodiment of this invention, which is identical with the transmission 60 of the fifth embodiment of FIGS. 13–15 in that the fourth clutch C4 is disposed between the converter 14 and the first planetary gear set 14 in the present transmission 120, while the fourth clutch C4 is disposed between the fist and second planetary gear sets 18, 20. The present transmission 120 have substantially the same advantages regarding the speed ratios, gear ratio range and operation as the transmission 60 of FIGS. 13–15. . The transmission 1110 is further advantageous in that the first planetary gear set 18 is held in a free state and its planetary gear P1 is therefore prevented from being rotated at an excessively high relative speed, when the transmission 120 is placed in the seventh-speed position in which the fourth clutch C4 is in the released state. The collinear chart of FIG. 33 is identical with that of FIG. 3, except in that the second rotary element RE2 consists of the first and second ring gears R1, R2, while the third rotary element RE3 consists of the first and second carriers CA1, CA2 and third ring gear R3. The foregoing descriptions by reference to FIG. 3 substantially apply to the present eleventh embodiment of FIGS. 31–33.

Referring next to the views of FIGS. 34–36 corresponding to those of FIGS. 1–3, there will be described a transmission 130 constructed according to a twelfth embodiment of this invention, which is identical with the transmission 70 of the sixth embodiment of FIGS. 16–18, except in that the fourth clutch C4 is disposed between the torque converter 14 and the first planetary gear 18 in the present transmission 130, while the fourth clutch C4 is disposed between the first and second planetary gear sets 18, 20 in the transmission 70. The present transmission 130 have substantially the same advantages regarding the speed ratios, gear ratio range and operation as the transmission 70 of FIGS. 16–18. The transmission 130 is further advantageous in that the first planetary gear set 18 is held in a free state and its planetary gear P1 is therefore prevented from being rotated at an excessively high relative speed, when the transmission 130 is placed in the seventh-speed position in which the fourth clutch C4 is in the released state. The collinear chart of FIG. 36 is also identical with that of FIG. 3, except in that the second rotary element RE2 consists of the first and second ring gears R1, R2, while the third rotary element RE3 consists of the first sun gear S1, second carrier CA2 and third ring gear R3. The foregoing descriptions by reference to FIG. 3 substantially apply to the present twelfth embodiment of FIGS. 34–36.

[0080] Referring next to the views of FIGS. 37–39 corresponding to those of FIGS. 1–3, there will be described a transmission 140 constructed according to a thirteen embodiment of this invention, which is identical with the transmission 80 of the seventh embodiment of FIGS. 19–21, except in that the fourth clutch C4 is disposed between the torque converter 14 and the first planetary gear 18 in the present transmission 140, while the fourth clutch C4 is disposed between the first and second planetary gear sets 18, 20 in the transmission 80. The present transmission 140 have substantially the same advantages regarding the speed ratios, gear ratio range and operation as the transmission 80 of FIGS. 19–21. The transmission 140 is further advantageous in that the first planetary gear set 18 is held in a free state and its planetary gear P1 is therefore prevented from being rotated at an excessively high relative speed, when the transmission 140 is placed in the seventh-speed position in which the fourth clutch C4 is in the released state. The collinear chart of FIG. 39 is also identical with that of FIG. 3, except in that the second rotary element RE2 consists of the first and second ring gears R1, R2, while the third rotary element RE3 consists of the first sun gear S1, second carrier CA2 and third ring gear R3. The foregoing descriptions by reference to FIG. 3 substantially apply to the present thirteenth embodiment of FIGS. 37–39.

Referring next to the views of FIGS. 40–42 corresponding to those of FIGS. 1–3, there will be described a transmission 150 constructed according to a fourteenth embodiment of this invention, which is identical with the transmission 90 of the seventh embodiment of FIGS. 22–24, except in that the fourth clutch C4 is disposed between the torque converter 14 and the first planetary gear 18 in the present transmission 140, while the fourth clutch C4 is disposed between the first and second planetary gear sets 18, 20 in the transmission 80. The present transmission 150 have substantially the same advantages regarding the speed ratios, gear ratio range and operation as the transmission 90 of FIGS. 22–24. The transmission 150 is further advantageous in that the first planetary gear set 18 is held in a free state and its planetary gear P1 is therefore prevented from being rotated at an excessively high relative speed, when the transmission 150 is placed in the seventh-speed position in which the fourth clutch C4 is in the released state. The collinear chart of FIG. 42 is also identical with that of FIG. 3, except in that the first rotary element RE1 consists of the first carrier CA1, and the second rotary element RE2 consists of the first and second ring gears R1, R2, while the third rotary element RE3 consists of the first sun gear S1, second carrier CA2 and third ring gear R3. The foregoing descriptions by reference to FIG. 3 substantially apply to the present fifteen embodiment of FIGS. 40–42.

Referring next to FIG. 43, there is there will be described a transmission 160 constructed according to a fifteenth embodiment of this invention, which is identical with the transmission 10 of the first embodiment of FIGS. 1–3, except in that the planetary gear P1 of the first planetary gear set 18 is a stepped pinion having a toothed portion $P_{1S}$ meshing with the sun gear S1 and a toothed portion $P_{1R}$ meshing with the ring gear R1, the toothed portions $P_{1S}$ and $P_{1R}$ having respective different diameters and respective different numbers of teeth. FIGS. 2 and 3 of the first embodiment apply to this transmission 160. Although the diameter of the toothed portion $P_{1S}$ of the planetary gear P1 is smaller than that of the toothed portion $P_{1R}$ in this embodiment, the diameter of the toothed portion $P_{1R}$ may be made larger than that of the toothed portion $P_{1S}$. The present transmission 160 in which the planetary gear P1 of the first planetary gear set 18 is the stepped pinion is advantageous in that the rotating speed of the planetary gear P1 can be reduced.

While the preferred embodiments of this invention have been described above in detail by reference to the drawings, for illustrative purpose only, it is to be understood that the present invention may be otherwise embodied.

In the illustrated embodiments described above, the first, second and third clutches C1, C2, C3 and the first, second and fourth brakes B1, B2, B3 are preferably constituted by hydraulic frictional coupling devices of multiple- or single-disc type operated by hydraulic cylinders. However, other coupling devices such as electromagentically operated coupling devices may be used as those clutches and brakes. For easier control of shifting actions of the transmission, a one-way clutch may be disposed in parallel with each of those clutches and brakes. A one-way clutch may be used in place of the brake, if an engine brake application to the vehicle is not required when that brake is engaged. Namely, a one-way clutch has a function of inhibiting a rotary action of a rotary element, like a brake. A series connection of a brake and a one-way clutch may be disposed in parallel connection with the first brake device.

In the illustrated embodiments, the torque converter 14 is disposed between the engine and the input shaft 16. However, the torque converter 14 may be replaced by a fluid coupling, an electromagnetic clutch of magnetic power type, or a hydraulically operated clutch of multiple- or single-disc type.

The illustrated transmissions 10, 30, 40, 50, 60, 70, 80, 90, 100, 110, 120, 130, 140, 150 and 160 are suitably used for a front-engine rear-drive vehicle (FR vehicle) in which the axis of rotation of the crankshaft of the engine is parallel to the longitudinal or running direction of the vehicle. However, a planetary gear type multiple-step transmission according to the present invention may be arranged to be used for a front-engine front-drive vehicle (FF vehicle) in which the axis of rotation of the crankshaft of the engine is parallel to the transverse or lateral direction of the vehicle. The illustrated transmissions 10, 30, 40, 50, 60, 70, 80, 90, 100, 110, 120, 130, 140, 150 and 160 may be arranged to be automatically shifted depending upon running conditions of an automotive vehicle such as an operating amount of its accelerator pedal and a running speed of the vehicle, the transmission may be shifted manually by the vehicle operator, with a suitable control switch or switch device such as upshift and downshift switches.

Although the planetary gear P1 of the first planetary gear set 18 in the transmission 160 of FIG. 43 is a stepped pinion, the planetary gear P2, P3 of the second or third planetary gear set 20, 22 may be a stepped pinion. Further, a stepped pinion may be used as any one of the planetary gears P1, P2, P3 in any of the other transmissions 10, 30, 40, 50, 60, 70, 80, 90, 100, 110, 120, 130, 140 and 150. In the stepped pinion used in the second and third planetary gear sets 20, 22, either of the toothed portions engaging the sun and ring gears may have a larger diameter.

In the collinear charts used to explain the illustrated embodiments, the vertical straight lines Y1, Y2, Y3, Y4 and Y5 corresponding to the respective rotary elements RE1, RE2, RE3, RE4 and RE5 are arranged in a spaced-apart relationship in the direction from the left toward the right. However, these vertical straight lines may be arranged in the direction from the right toward the left. While the horizontal straight line X2 corresponding to the rotating speed of "1.0" is located above the horizontal straight line X1 corresponding to the rotating speed of "0", the horizontal straight line X2 may be located below the horizontal straight line X1.

Each of the first through fifth rotary elements RE1–RE5 may consist of suitably selected at least one of the sun gears, ring gears and carries of the first planetary gear set 18 and second planetary gear set 20, or these two planetary gear sets 18, 20 and at least one other planetary gear set such as the third planetary gear set 22.

It is to be understood that the present invention may be embodied with various other changes, modifications and improvements, which may occur to those skilled in the art, in the light of the technical teachings of the present invention which have been described.

What is claimed is:

1. A planetary gear type multiple-step transmission for a vehicle, having seven forward drive positions for driving the vehicle in a forward direction, said seven forward drive positions including a first-speed, a second-speed, a third-speed, a fourth-speed, a fifth-speed, a sixth-speed and a seventh-speed position, said transmission comprising an input rotary member, an output rotary member, a first, a second and a third planetary gear set each including a sun gear, a carrier and a ring gear, and further comprising a first, a second and a third brake, and a first, a second, and a fourth clutch, wherein an improvement comprises:

(a) a first, a second, a third, a fourth and a fifth rotary element, each of which is constituted by at least one of the sun gears, carriers and ring gears of said first, second and third planetary gear sets, said first rotary element being selectively brought to a stationary state by said first brake, and said second rotary element being selectively brought to a stationary state by said second brake, while said third rotary element being selectively brought to a stationary state by said third brake, said fifth, rotary element being selectively connected to said input rotary member by said first clutch, said fourth rotary element being connected to said output rotary member;

(b) said third rotary element consisting of a first element which is one of said sun gear, carrier and ring gear of said first planetary gear set, a second element which is one of said sun gear, carrier and ring gear of said second planetary gear set, and a third element which is one of said sun ear, carrier and ring gear of said third planetary gear set, said first, second and third elements being rotatable together as a unit by engagement of said fourth clutch, and selectively connected to said input rotary member through said second clutch, and at least one of said sun gears, carriers and ring gears of said first, second and third planetary gear sets which is other than said first, second and third elements being selectively connected to said input rotary member through said first clutch;

(c) said fifth-speed position having a speed ratio of 1, while said sixth-speed and seventh-speed positions having speed ratios smaller than 1; and (d) said first-speed position being established by engaging said first clutch and said third brake, or said first and fourth clutches and said third brake, and said second-speed position being established by said first clutch and said second brake, while said third-speed position being established by engaging said first and fourth clutches and said first brake, said fourth-speed position being established by engaging said first and second clutches and said first brake, said fifth-speed position being established by engaging said first, second and fourth clutches, said sixth-speed position being established by engaging said second and fourth clutches and said first brake, said seventh-speed position being established by engaging said second and fourth clutches and said second brake.

2. A planetary gear type multiple-step transmission according to claim 1, wherein said first, second and third planetary gear sets are arranged between said input and output shafts.

3. A planetary gear type multiple-step transmission according to claim 1, wherein the vehicle has an engine and a torque converter, and an output of said engine is transmitted to said input shaft through said torque converter.

4. A planetary gear type multiple-step transmission according to claim 1, further comprising a one-way clutch disposed in parallel with one of said first, second, third and fourth clutches and said first, second and third brakes.

5. A planetary gear type multiple-step transmission according to claim 1, wherein each of said first, second and third planetary gear sets is a single-pinion type planetary gear set, and said first rotary element consists of said sun gear of said first planetary gear set, and said second rotary element consists of said carrier of said first planetary gear set and said ring gear of said second planetary gear set, while said third rotary element consists of said ring gear of said first planetary set, said carrier of said second planetary gear set and said ring gear of said third planetary gear set, said fourth rotary element consisting of said carrier of said third planetary gear set, and said fifth rotary element consisting of said sun gear and said of said second planetary gear set and said sun gear of said third planetary gear set.

6. A planetary gear type multiple-step transmission according to claim 5, further having a rear drive position for driving the vehicle in a reverse direction, said rear drive position being established by engaging a third clutch and said fourth clutch and said third brake, said first rotary element being selectively connected to said input rotary element through said third clutch, and said gear ratios of said first, second and third planetary gear sets are being determined such that said rear drive position has a speed ratio between those of said first-speed and second-speed positions.

7. A planetary gear type multiple-step transmission according to claim 1, wherein said first planetary gear set is a double-pinion type gear set, while each of said second and third planetary gear sets is a single-pinion type planetary gear set, and said first rotary element consists of said sun gear of said first planetary gear set, and said second rotary element consists of said ring gear of said first planetary gear set and said ring gear of said second planetary gear set, while said third rotary element consists of said carrier of said first planetary gear set, said carrier of said second planetary gear set and said ring gear of said third planetary gear set, said fourth rotary element consisting of said carrier of said third planetary gear set, and said fifth rotary element consisting of said sun gear of said second planetary gear set and said sun gear of said third planetary gear set.

8. A planetary gear type multiple-step transmission according to claim 7, further having a rear drive position for driving the vehicle in a reverse direction, said rear drive position being established by engaging said second clutch and said first and third brakes, and said gear ratios of said first, second and third planetary gear sets have respective gear ratios which are being determined such that said rear drive position has a speed ratio between those of said first-speed and second-speed positions.

9. A planetary gear type multiple-step transmission according to claim 7, further having a rear drive position for driving the vehicle in a reverse direction, said rear drive position being established by engaging a third clutch and said fourth clutch and said third brake, said first rotary element being selectively connected to said input rotary element through said third clutch, and said gear ratios of said first, second and third planetary gear sets having being determined such that said rear drive position has a speed ratio between those of said first-speed and second-speed positions.

10. A planetary gear type multiple-step transmission according to claim 1, wherein said first planetary gear set is a double-pinion type planetary gear set, while each of said second and third planetary gear sets is a single-pinion type planetary gear set, and said first rotary element consists of said carrier of said first planetary gear set, and said second rotary element consists of said ring gear of said first planetary gear set and said ring gear of said second planetary gear set, while said third rotary element consists of said sun gear of said first planetary set, said carrier of said second planetary gear set and said ring gear of said third planetary gear set, said fourth rotary element consisting of said carrier of said third planetary gear set, and said fifth rotary element consisting of said sun gear and said of said second planetary gear set and said sun gear of said third planetary gear set.

11. A planetary gear type multiple-step transmission according to claim 10, further having a rear drive position for driving the vehicle in a reverse direction, said rear drive position being established by engaging said second clutch and said first and third brakes, and said gear ratios of said first, second and third planetary gear sets have being determined such that said rear drive position has a speed ratio between those of said first-speed and second-speed positions.

12. A planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein said first planetary gear set including a first sun gear, a first planetary gear, a first carrier rotatably supporting said first planetary gear, and a first ring gear meshing with said first sun gear through said first planetary gear, said second planetary gear set including a second sun gear, a second planetary gear, a second carrier rotatably supporting said second planetary gear, and a second ring gear meshing with said second sun gear through said second planetary gear, said third planetary gear set including a third sun gear, a third planetary gear, a third carrier rotatably supporting said third planetary gear, and a third ring gear meshing with said third sun gear through said third planetary gear, said transmission being operable to transmit a rotary motion of said input rotary member to said output rotary member such that a ratio of the speed of said input rotary member to the speed of said output rotary member is variable in steps, wherein an improvement comprises:

said first carrier and said second ring gear being connected to each other;

said first ring gear and said second carrier being connected to each other through said fourth clutch;

said second carrier and said third ring gear being connected to each other while said second and third sun gears being connected to each other;

said input rotary member being connected to said first sun gear through said third clutch;

said input rotary member being connected to said first ring gear through said second clutch;

said input rotary member being connected to said second and third sun gears through said first clutch;

said first brake being disposed between said stationary rotary member and said first sun gear;

said second brake being disposed between said stationary rotary member and said first carrier;

said third brake being disposed between said third ring gear and said stationary rotary member; and said output rotary member is connected to said third carrier.

13. A planetary gear type multiple-step transmission according to claim 12, having seven forward drive positions for driving the vehicle in a forward direction, said seven forward drive positions including a first-speed position having a highest speed ration, a second-speed position having a speed ratio lower than that of said first-speed position, a third-speed position having a speed ratio lower than that of said second-speed position, a fourth-speed position having a speed ratio lower than that of said third-speed position, a fifth-speed position having a speed ratio lower than that of said fourth-speed position, a sixth-speed position having a speed ration lower than that of said fifth-speed position, and a seventh-speed position having a speed ratio lower than that of said sixth-speed ratio, and wherein said first-speed position is established by engaging said first clutch and said third brake to connect said input rotary member to said second and third sun gears, and to connect said third ring gear and said stationary rotary member to each other, said second-speed position being established by engaging said first clutch and said second brake to connect said input rotary member to said second and third sun gears, and to connect said first carrier and said stationary rotary member to each other, said third-speed position being established by engaging said first clutch and said first brake to connect said input rotary member to said second and third sun gears, and to connect said first sun gear and said stationary rotary member to each other, said fourth-speed position being established by engaging said first and second clutches and said first brake to connect said input rotary member to said second and third sun gears, to connect said input rotary member to said first ring gear, and to connect said first sun gear and said stationary rotary member, said fifth-speed position being established by engaging said first, second and fourth clutches to connect said input rotary member to said second and third sun gears, to connect said input rotary member to said first ring gear, and to connect said first ring gear and said second carrier, said sixth-speed position being established by engaging said second and fourth clutches and said first brake to connect said input rotary member to said first ring gear, to connect said first ring gear and said second carrier to each other, and to connect said first sun gear and said stationary rotary member, and said seventh-speed position beings established by engaging said second and fourth clutches and said second brake to connect said input rotary member to said first ring gear, to connect said first ring gear and said second carrier, and to connect said second carrier and said stationary rotary member to each other.

14. A planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein said first planetary gear set including a first sun gear, a first planetary gear, a first carrier rotatably supporting said first planetary gear, and a first ring gear meshing with said first sun gear through said first planetary gear, said second planetary gear set including a second sun gear, a second planetary gear, a second carrier rotatably supporting said second planetary gear, and a second ring gear meshing with said second sun gear through said second planetary gear, said third planetary gear set including a third sun gear, a third planetary gear, a third carrier rotatably supporting said third planetary gear, and a third ring gear meshing with said third sun gear through said third planetary gear, said transmission being operable to transmit a rotary motion of said input rotary member to said output rotary member such that a ratio of the speed of said input rotary member to the speed of said output rotary member is variable in steps, wherein an improvement comprises:

said first and second carriers and said third ring gear being connected to each other;

said first and second ring gears being connected to each other;

said second and third sun gears being connected to each other;

said input rotary member being connected to said second and third sun gears through said first clutch:

said input rotary member being connected to said first carrier, or to an assembly of said first and second carriers and said third ring gear, through said second clutch;

said input rotary member being connected to said first sun gear through said third clutch;

said fourth clutch being disposed between said first and second carriers;

said first brake being disposed between said first sun gear and said stationary rotary member;

said second brake being disposed between said stationary rotary member and an assembly of said first and second ring gears;

said third brake being disposed between said stationary rotary member and an assembly of said first and second carriers and said third ring gear; and said third carrier being connected to said output rotary member.

15. A planetary gear type multiple-step transmission according to claim 14, having seven forward drive positions for driving the vehicle in a forward direction, said seven forward drive positions including a first-speed position having a highest speed ration, a second-speed position having a speed ratio lower than that of said first-speed position, a third-speed position having a speed ratio lower than that of said second-speed position, a fourth-speed position having a speed ratio lower than that of said third-speed position, a fifth-speed position having a speed ratio lower than that of said fourth-speed position, a sixth-speed position having a speed ration lower than that of said fifth-speed position, and a seventh-speed position having a speed ratio lower than that of said sixth-speed ratio, and wherein said first-speed position is established by engaging said first clutch and said third brake to connect said input rotary member to said second and third sun gears, and to connect said third ring gear and said stationary rotary member to each other, said second-speed position being established by engaging said first clutch and said second brake to connect said input rotary member to said second and third sun gears, and to connect said first and second ring gears to said stationary rotary member to each other, said third-speed position being established by engaging said first and fourth clutches and said first brake to connect said input rotary member to said second and third sun gears, to connect said first and second carriers to each other, and to connect said first sun gear and said stationary rotary member to each other, said fourth-speed position being established by engaging said first and second clutches and said first brake to connect said input rotary member to said second and third sun gears, to connect said input rotary member to said first or second carrier, and to connect said first sun gear and said stationary rotary member to each other, said fifth-speed position being established by engaging said first, second and fourth clutches to connect said input rotary member to said second and third sun gears, to connect said input rotary member to said first or second carrier, and to connect said first and second carriers to each other, said sixth-speed position being established by engaging said second and fourth clutches and said first brake to connect said input rotary member to said first or second carrier, to connect said first and second carriers to each other, and to connect said first sun gear and said stationary rotary member, and said seventh-speed position being established by engaging said second and fourth clutches and said second brake to connect said input rotary member to said first or second carrier, to connect said first and second carriers to each other, and to connect said first and second ring gear to said stationary rotary member to each other.

16. A planetary gear type multiple-step transmission for a vehicle, comprising a stationary rotary member, an input rotary member, an output rotary member, a first, a second and a third planetary gear set which are disposed coaxially with each other, a first, a second, and a fourth clutch, and a first, a second and a third brake, and wherein said first planetary gear set including a first sun gear, a first planetary gear, a first carrier rotatably supporting said first planetary gear, and a first ring gear meshing with said first sun gear through said first planetary gear, said second planetary gear set including a second sun gear, a second planetary gear, a second carrier rotatably supporting said second planetary gear, and a second ring gear meshing with said second sun gear through said second planetary gear, said third planetary gear set including a third sun gear, a third planetary gear, a third carrier rotatably supporting said third planetary gear, and a third ring gear meshing with said third sun gear through said third planetary gear, said transmission being operable to transmit a rotary motion of said input rotary member to said output rotary member such that a ratio of the speed of said input rotary member to the speed of said output rotary member is variable in steps, wherein an improvement comprises:

said second carrier and said third ring gear being connected to each other;

said first and second ring gears being connected to each other;

said second and third sun gears being connected to each other;

said input rotary member being connected to said second and third sun gears through said first clutch;

said input rotary member being connected to said first carrier through said second clutch;

said fourth clutch being disposed between said first and second carriers;

said first brake being disposed between said first sun gear and said stationary rotary member;

said second brake being disposed between said stationary rotary member and an assembly of said first and second ring gears;

said third brake being disposed between said stationary rotary member and an assembly of said second carrier and said third ring gear; and said third carrier being connected to said output rotary member.

17. A planetary gear type multiple-step transmission according to claim 16, having seven forward drive positions for driving the vehicle in a forward direction, said seven forward drive positions including a first-speed position having a highest speed ration, a second-speed position having a speed ratio lower than that of said first-speed position, a third-speed position having a speed ratio lower than that of said second-speed position, a fourth-speed position having a speed ratio lower than that of said third-speed position, a fifth-speed position having a speed ratio lower than that of said fourth-speed position, a sixth-speed position having a speed ration lower than that of said fifth-speed position, and a seventh-speed position having a speed ratio lower than that of said sixth-speed ratio, and wherein said first-speed position is established by engaging said first clutch and said third brake to connect said input rotary member to said second and third sun gears, and to connect said third ring gear and said stationary rotary member to each other, said second-speed position being established by engaging said first clutch and said second brake to connect said input rotary member to said second and third sun gears, and to connect said first and second ring gears to said stationary rotary member to each other, said third-speed position being established by engaging said first and fourth clutches and said first brake to connect said input rotary member to said second and third sun gears, to connect said first and second carriers to each other, and to connect said first sun gear and said stationary rotary member to each other, said fourth-speed position being established by engaging said first and second clutches and said first brake to connect said input rotary member to said second and third sun gears, to connect said input rotary member to said first carrier, and to connect said first sun gear and said stationary rotary member to each other, said fifth-speed position being established by engaging said first, second and fourth clutches to connect said input rotary member to said second and third sun gears, to connect said input rotary member to said first carrier, and to connect said first and second carriers to each other, said sixth-speed position being established by engaging said second and fourth clutches and said first brake to connect said input rotary member to said first carrier, to connect said first and second carriers to each other, and to connect said first sun gear and said stationary rotary member, and said seventh-speed position being established by engaging said second and fourth clutches and said second brake to connect said input rotary member to said first carrier, to connect said first and second carriers to each other, and to connect said first and second ring gear to said stationary rotary member to each other.

18. A planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein said first planetary gear set including a first sun gear, a first planetary gear, a first carrier rotatably supporting said first planetary gear, and a first ring gear meshing with said first sun gear through said first planetary gear, said second planetary gear set including a second sun gear, a second planetary gear, a second carrier rotatably supporting said second planetary gear, and a second ring gear meshing with said second sun gear through said second planetary gear, said third planetary gear set including a third sun gear, a third planetary gear, a third carrier rotatably supporting said third planetary gear, and a third ring gear meshing with said third sun gear through said third planetary gear, said transmission being operable to transmit a rotary motion of said input rotary member to said output rotary member such that a ratio of the speed of said input rotary member to the speed of said output rotary member is variable in steps, wherein an improvement comprises:

said second carrier and said third ring gear being connected to each other;

said first and second ring gears are connected to each other;

said second and third sun gears being connected to each other;

said input rotary member being connected to said second and third sun gears through said first clutch;

said input rotary member being connected to said second carrier and said third ring gear through said second clutch;

said input rotary member being connected to said first carrier through said third clutch;

said fourth clutch being disposed between said first and second carriers;

said first brake being disposed between said first sun gear and said stationary rotary member;

said second brake being disposed between said stationary rotary member and an assembly of said first and second ring gears;

said third brake being disposed between said stationary rotary member and an assembly of said second carrier and said third ring gear; and said third carrier being connected to said output rotary member.

19. A planetary gear type multiple-step transmission according to claim 18, having seven forward drive positions for driving the vehicle in a forward direction, said seven forward drive positions including a first-speed position having a highest speed ration, a second-speed position having a speed ratio lower than that of said first-speed position, a third-speed position having a speed ratio lower than that of said second-speed position, a fourth-speed position having a speed ratio lower than that of said third-speed position, a fifth-speed position having a speed ratio lower than that of said fourth-speed position, a sixth-speed position having a speed ration lower than that of said fifth-speed position, and a seventh-speed position having a speed ratio lower than that of said sixth-speed ratio, and wherein said first-speed position is established by engaging said first clutch and said third brake to connect said input rotary member to said second and third sun gears, and to connect said third ring gear and said stationary rotary member to each other, said second-speed position being established by engaging said first clutch and said second brake to connect said input rotary member to said second and third sun gears, and to connect said first and second ring gears to said stationary rotary member to each other, said third-speed position being established by engaging said first and fourth clutches and said first brake to connect said input rotary member to said second and third sun gears, to connect said first and second carriers to each other, and to connect said first sun gear and said stationary rotary member to each other, said fourth-speed position being established by engaging said first and third clutches and said first brake to connect said input rotary member to said second and third sun gears, to connect said input rotary member to said first carrier, and to connect said first sun gear and said stationary rotary member to each other, said fifth-speed position being established by engaging said first and second clutches to connect said input rotary member to said second and third sun gears and to connect said input rotary member to said second carrier, said sixth-speed position being established by engaging said second and fourth clutches and said first brake to connect said input rotary member to said second carrier, to connect said first and second carriers to each other, and to connect said first sun gear and said stationary rotary member, and said seventh-speed position being established by engaging said second clutch and said second brake to connect said input rotary member to said second carrier, to connect said first and second ring gears to said stationary rotary member to each other.

20. A planetary gear type multiple-step transmission for a vehicle, comprising a stationary rotary member, an input rotary member, an output rotary member, a first, a second and a third planetary gear set which are disposed coaxially with each other, a first, a second, and a fourth clutch, and a first, a second and a third brake, and wherein said first planetary gear set including a first sun gear, a first planetary gear, a first carrier rotatably supporting said first planetary gear, and a first ring gear meshing with said first sun gear through said first planetary gear, said second planetary gear set including a second sun gear, a second planetary gear, a second carrier rotatably supporting said second planetary gear, and a second ring gear meshing with said second sun gear through said second planetary gear, said third planetary gear set including a third sun gear, a third planetary gear, a third carrier rotatably supporting said third planetary gear, and a third ring gear meshing with said third sun gear through said third planetary gear, said transmission being operable to transmit a rotary motion of said input rotary member to said output rotary member such that a ratio of the speed of said input rotary member to the speed of said output rotary member is variable in steps, wherein an improvement comprises:

said second carrier and said third ring gear being connected to each other;

said first and second ring gears being connected to each other;

said second and third sun gears being connected to each other;

said input rotary member being connected to said second and third sun gears through said first clutch;

said input rotary member being connected to said first sun gear through said second clutch;

said fourth clutch being disposed between said first sun gear and said second carrier;
said first brake being disposed between said first carrier and said stationary rotary member;
said second brake being disposed between said stationary rotary member and an assembly of said first and second ring gears;
said third brake being disposed between said stationary rotary member and an assembly of said second carrier and said third ring gear; and
said third carrier being connected to said output rotary member.

21. A planetary gear type multiple-step transmission according to claim 20, having seven forward drive positions for driving the vehicle in a forward direction, said seven forward drive positions including a first-speed position having a highest speed ration, a second-speed position having a speed ratio lower than that of said first-speed position, a third-speed position having a speed ratio lower than that of said second-speed position, a fourth-speed position having a speed ratio lower than that of said third-speed position, a fifth-speed position having a speed ratio lower than that of said fourth-speed position, a sixth-speed position having a speed ration lower than that of said fifth-speed position, and a seventh-speed position having a speed ratio lower than that of said sixth-speed ratio, and wherein said first-speed position is established by engaging said first clutch and said third brake to connect said input rotary member to said second and third sun gears, and to connect said third ring gear and said stationary rotary member to each other,
said second-speed position being established by engaging said first clutch and said second brake to connect said input rotary member to said second and third sun gears, and to connect said first and second ring gears to said stationary rotary member to each other,
said third-speed position being established by engaging said first and fourth clutches and said first brake to connect said input rotary member to said second and third sun gears, to connect said first and second carriers to each other, and to connect said first sun gear and said stationary rotary member to each other,
said fourth-speed position being established by engaging said first and second clutches and said first brake to connect said input rotary member to said second and third sun gears, to connect said input rotary member to said first carrier, and to connect said first carrier and said stationary rotary member to each other,
said fifth-speed position being established by engaging said first, second and fourth clutches to connect said input rotary member to said second and third sun gears, to connect said input rotary member to said first sun gear, and to connect said first sun gear and said second carrier,
said sixth-speed position being established by engaging said second and fourth clutches and said first brake to connect said input rotary member to said first sun gear, to connect said first sun gear and said second carrier to each other, and to connect said first carrier and said stationary rotary member to each other, and
said seventh-speed position being established by engaging said second and fourth clutches and said second brake to connect said input rotary member to said first sun gear, to connect said first sun gear and said second carrier to each other, and to connect said first and second ring gears to said stationary rotary member.

22. A planetary gear type multiple-step transmission for a vehicle, comprising a stationary rotary member, an input rotary member, an output rotary member, a first, a second and a third planetary gear set which are disposed coaxially with each other, a first, a second, a third and a fourth clutch, and a first, a second and a third brake, and wherein said first planetary gear set including a first sun gear, a first planetary gear, a first carrier rotatably supporting said first planetary gear, and a first ring gear meshing with said first sun gear through said first planetary gear, said second planetary gear set including a second sun gear, a second planetary gear, a second carrier rotatably supporting said second planetary gear, and a second ring gear meshing with said second sun gear through said second planetary gear, said third planetary gear set including a third sun gear, a third planetary gear, a third carrier rotatably supporting said third planetary gear, and a third ring gear meshing with said third sun gear through said third planetary gear, said transmission being operable to transmit a rotary motion of said input rotary member to said output rotary member such that a ratio of the speed of said input rotary member to the speed of said output rotary member is variable in steps, wherein an improvement comprises:

said second carrier and said third ring gear being connected to each other;
said first and second ring gears being connected to each other;
said second and third sun gears being connected to each other;
said input rotary member being connected to said second and third sun gears through said first clutch,
said input rotary member being connected to said second carrier and said third ring gear through said second clutch;
said input rotary member being connected to said first sun gear through said third clutch;
said fourth clutch being disposed between said first sun gear and said second carrier;
said first brake being disposed between said first carrier and said stationary rotary member;
said second brake being disposed between said stationary rotary member and an assembly of said first and second ring gears;
said third brake being disposed between said stationary rotary member and an assembly of said second carrier and said third ring gear; and
said third carrier being connected to said output rotary member.

23. A planetary gear type multiple-step transmission according to claim 22, having seven forward drive positions for driving the vehicle in a forward direction, said seven forward drive positions including a first-speed position having a highest speed ration, a second-speed position having a speed ratio lower than that of said first-speed position, a third-speed position having a speed ratio lower than that of said second-speed position, a fourth-speed position having a speed ratio lower than that of said third-speed position, a fifth-speed position having a speed ratio lower than that of said fourth-speed position, a sixth-speed position having a speed ration lower than that of said fifth-speed position, and a seventh-speed position having a speed ratio lower than that of said sixth-speed ratio, and wherein said first-speed position is established by engaging said first clutch and said third brake to connect said input rotary member to said second and third sun gears, and to connect said third ring gear and said stationary rotary member to each other, said second-speed position being established by engaging said first clutch and said second brake to connect said input rotary member to said second and third sun gears, and to connect said first and second ring gears to said stationary rotary member to each other, said third-speed position being established by engaging said first and fourth clutches and said first brake to connect said input rotary member to said second and third sun gears, to connect said first sun gear and said second carrier to each other, and to connect said first carrier and said stationary rotary member to each other, said fourth-speed position being established by engaging said first and third clutches and said first brake to connect said input rotary member to said second and third sun gears, to connect said input rotary member to said first sun gear, and to connect said first carrier and said stationary rotary member to each other, said fifth-speed position being established by engaging said first and second clutches to connect said input rotary member to said second and third sun gears, and to connect said input rotary member and said second carrier to each other, said sixth-speed position being established by engaging said second and fourth clutches and said first brake to connect said input rotary member to said second carrier, to connect said first sun gear and said second carrier to each other, and to connect said first carrier and said stationary rotary member to each other, and said seventh-speed position being established by engaging said second clutch and said second brake to connect said input rotary member to said second carrier, and to connect said first and second ring gears to said stationary rotary member.

24. A planetary gear type multiple-step transmission for a vehicle, having seven forward drive positions for driving the vehicle in a forward direction, said seven forward drive positions including a first-speed, a second-speed, a third-speed, a fourth-speed, a fifth-speed, a sixth-speed and a seventh-speed position, said transmission comprising an input rotary member, an output rotary member, a first, a second and a third planetary gear set each including a sun gear, a carrier and a ring gear, and further comprising a first, a second and a third brake, and a first, a second, a third and a fourth clutch, wherein an improvement comprises:

(a) a first, a second, a third, a fourth and a fifth rotary element, each of which is constituted by at least one of the sun gears, carriers and ring gears of said first, second and third planetary gear sets, said first rotary element being selectively brought to a stationary state by said first brake, and said second rotary element being selectively brought to a stationary state by said second brake, while said third rotary element being selectively brought to a stationary state by said third brake, said fifth rotary element being selectively connected to said input rotary member by said first clutch, said fourth rotary element being connected to said output rotary member, (b) said third rotary element consisting of a first element which is one of said sun gear, carrier and ring gear of said first planetary gear set, a second element which is one of said sun gear, carrier and ring gear of said second planetary gear set, and a third element which is one of said sun gear, carrier and ring gear of said third planetary gear set, said first, second and third elements being rotatable together as a unit by engagement of said fourth clutch, and selectively connected to said input rotary member through said second clutch, and at least one of said sun gears, carriers and ring gears of said first, second and third planetary gear sets which is other than said first, second and third elements being selectively connected to said input rotary member through said first clutch;

(c) said fifth-speed position having a speed ratio of 1, while said sixth-speed and seventh-speed positions having speed ratios smaller than 1; and (d) said first-speed position being established by engaging said first clutch and said third brake, or said first and fourth clutches and said third brake, and said second-speed position being established by said first clutch and said second brake, while said third-speed position being established by engaging said first and fourth clutches and said first brake, said fourth-speed position being established by engaging said first and third clutches and said first brake, said fifth-speed position being established by engaging said first and second clutches, said sixth-speed position being established by engaging said second and fourth clutches and said first brake, said seventh-speed position being established by engaging said second clutch and said second brake.

25. A planetary gear type multiple-step transmission according to claim 24, wherein said first, second and third planetary gear sets are arranged between said input and outputs shafts.

26. A planetary gear type multiple-step transmission according to claim 24, wherein the vehicle has an engine and a torque converter, and an output of said engine is transmitted to said input shaft through said torque converter.

27. A planetary gear type multiple-step transmission according to claim 24, further comprising a one-way clutch disposed in parallel with one of said first, second, third and fourth clutches and said first, second and third brakes.

28. A planetary gear type multiple-step transmission according to claim 24, wherein said first planetary gear set is a double-pinion type gear set, while each of said second and third planetary gear sets is a single-pinion type planetary gear set, and said first rotary element consists of said sun gear of said first planetary gear set, and said second rotary element consists of said ring gear of said first planetary gear set and said ring gear of said second planetary gear set, while said third rotary element consists of said carrier of said first planetary gear set, said carrier of said second planetary gear set and said ring gear of said third planetary gear set, said fourth rotary element consisting of said carrier of said third planetary gear set, and said fifth rotary element consisting of said sun gear of said second planetary gear set and said sun gear of said third planetary gear set.

29. A planetary gear type multiple-step transmission according to claim 28, further having a rear drive position for driving the vehicle in a reverse direction, said rear drive position being established by engaging said third clutch and said first and third brakes, and said gear ratios of said first, second and third planetary gear sets being determined such that said rear drive position has a speed ratio between those of said first-speed and second-speed positions.

30. A planetary gear type multiple-step transmission according to claim 24, wherein said first planetary gear set is a double-pinion type gear set, while each of said second and third planetary gear sets is a single-pinion type planetary gear set, and said first rotary element consists of said carrier of said first planetary gear set, and said second rotary element consists of said ring gear of said first planetary gear set and said ring gear of said second planetary gear set, while said third rotary element consists of said sun gear of said first planetary gear set, said carrier of said second planetary gear set and said ring gear of said third planetary gear set, said fourth rotary element consisting of said carrier of said third planetary gear set, and said fifth rotary element consisting of said sun gear of said second planetary gear set and said sun gear of said third planetary gear set.

31. A planetary gear type multiple-step transmission according to claim 30, further having a rear drive position for driving the vehicle in a reverse direction, said rear drive position being established by engaging said third clutch and said first and third brakes, and said gear ratios of said first, second and third planetary gear sets being determined such that said rear drive has a speed ratio between those of said first-speed and second-speed positions.

* * * * *